United States Patent [19]
Barratt et al.

[11] Patent Number: 5,909,470
[45] Date of Patent: Jun. 1, 1999

[54] METHOD AND APPARATUS FOR DECISION DIRECTED DEMODULATION USING ANTENNA ARRAYS AND SPATIAL PROCESSING

[75] Inventors: Craig H. Barratt, Redwood City; Farhad Farzaneh, San Francisco; David M. Parish, Los Altos, all of Calif.

[73] Assignee: ArrayComm, Inc., San Jose, Calif.

[21] Appl. No.: 08/729,390

[22] Filed: Oct. 11, 1996

[51] Int. Cl.[6] ....................................... H04L 27/14
[52] U.S. Cl. ........................... 375/324; 375/326
[58] Field of Search ..................... 375/326, 347, 375/348, 346, 324; 343/879, 893; 370/310

[56] References Cited

U.S. PATENT DOCUMENTS 5,592,490  1/1997  Barratt et al. .......................... 370/310

OTHER PUBLICATIONS

A. van der Veen and A. Paulraj, "A constant modulus factorization techique for smart antenna applications in mobile communications," in *Proc. SPIE, "Advances Signal Processing Algorithms, Architectures, and Implementations V"* (F. Luk, ed.), vol. 2296, (San Diego, CA), pp. 230–241, Jul. 1994.

S. Talwar and A. Paulraj, "Recursive algorithms for estimating multiple co–channel digital signals received at ana antenna array," in *Proc. Fifth Annual IEEE Dual Use Technologies and Applications Conference*, May 1995.

S. Talwar, M. Viberg and A. Paulraj, "Blind estimation of multiple co–channel digital signals arriving at an antenna array," in *Proc. 27th Asilomar Conference on Signals, Systemsf and Computers*, vol. I, pp. 349–342, 1993.

A. L. Swindlehurst, S. Daas and J.Yang, "Analysis of a decision directed beamformer," *IEEE Transactions on Signal Processing*, vol. 43, No. 12, pp. 2920–2927, Dec. 1995.

*Primary Examiner*—Temesghen Ghebretinsae
*Attorney, Agent, or Firm*—Townsend and Townsend and Crew, LLP; Henry K. Woodward

[57] ABSTRACT

A method and apparatus for generating a reference signal for use in an alternating projection loop which is part of demodulation in a base station of a wireless communication system, the reference signal relaxed to minimize the effects of frequency offset and amplitude variations, the base station including an array of antennas. The alternating projection loop demodulates in the presence of co-channel interference and includes correction for time alignment and/or frequency offset.

28 Claims, 9 Drawing Sheets

| R | SS | PREAMBLE | UW | CI | CdSIC | CgSIC | UIB | CRC |
|---|----|----------|----|----|-------|-------|-----|-----|
| 4 | 2  | 62       | 32 | 4  | 42    | 28    | 34  | 16  |

R: Ramp Time
SS: Start Symbols
UW: Unique World
CI: Channel Identifier
CdSIC: Called Station Identification Code
CgSIC: Calling Station Identification Code
UIB: Uplink Idle Bits
CRC: Cyclic Redundancy Check

*FIG. 2*

METHOD AND APPARATUS FOR DECISION DIRECTED DEMODULATION USING ANTENNA ARRAYS AND SPATIAL PROCESSING

CROSS-REFERENCE TO RELATED APPLICATIONS

This application is related to the concurrently filed, co-owned, and co-pending patent application Ser. No. 08/729,386, filed Oct. 11, 1996 entitled "Method And Apparatus for Estimating Parameters of a Communication System Using Antenna Arrays and Spatial Processing," incorporated herein by reference, and hereinafter referred to as "Our Parameter Estimation Invention."

I. BACKGROUND OF THE INVENTION

A. Field of the Invention

The field of the present invention is wireless (radio) communications. In particular, the field is using antenna arrays and spatial signal processing in wireless communications systems to perform demodulation, including correction for frequency offset and alignment, in the presence of co-channel interference.

B. Background

Spatial processing

Users of a wireless communications system typically access the system using remote terminals such as cellular telephones and data modems equipped with radio transceivers. Such systems generally have one or more radio base stations, each of which provides coverage to a geographic area known as a cell. The remote terminals and base stations have protocols for initiating calls, receiving calls, and general transfer of information.

In such a system, an allocated portion of the spectrum is divided up into communication channels which may be distinguished by frequency, by time, by code, or by some combination of the above. Each of these communication channels will be referred to herein as a conventional channel. To provide full-duplex communication links, typically some of the communication channels are used for communication from base stations to users' remote terminals (the downlink), and others are used for communication from users' remote terminals to base stations (the uplink). Within its cell, a radio base station can communicate simultaneously with many remote terminals by using different conventional communication channels for each remote terminal.

We have previously disclosed spatial processing with antenna arrays to increase the spectrum efficiency of such systems. See U.S. patent applications: Ser. No. 07/806,695 filed Dec. 12, 1991, entitled *Multiple Access Wireless Communications Systems* (also U.S. Pat. No. 5,515,378 issued May 7, 1996); Ser. No. 08/234,747, filed Apr. 28, 1994, entitled *Method and Apparatus for Calibrating Antenna Arrays* (now U.S. Pat. No. 5,546,909 issued Aug. 13, 1996); Ser. No. 08/283,470, filed Aug. 1, 1994, entitled *Spectrally Efficient and High Capacity Acknowledgment Radio Paging System* now U.S. Pat. No. 5,625,880; and Ser. No. 08/375,848, filed Jan. 20, 1995, entitled *Spectrally Efficient High Capacity Wireless Communications Systems* now U.S. Pat. No. 5,592,490 (collectively, "Our Co-Pending Patent Applications"). The general idea is to increase the quality of communication by using an antenna array rather than a single antenna, together with processing of the signals received at the antennas. The antenna array also can be used to increase spectrum efficiency by adding spatial multiplexing to conventional channels so that several users can communicate simultaneously on the same conventional channel. We call this SDMA for spatial division multiple access. Thus, taking frequency division multiplexing (FDMA) as an example, with SDMA, several remote terminals may communicate with one or more base stations on a single cell on the same frequency channel, that is, on the same conventional channel. Similarly, with time division multiplexing (TDMA) and SDMA, several remote terminals may communicate with one or more base stations on a single cell on the same frequency channel and the same time slot, that is, on the same conventional channel. SDMA likewise also can be used with code division multiple access (CDMA).

The general problem addressed by the present invention is to design a wireless communication system to be able to successfully receive and demodulate a particular signal or signals from a particular source in the presence of interfering signals from one or more interfering sources. In many situations, in particular in the case of cellular communications systems, the interfering signals are actually from other sources in the same communications system and so have the same modulation format. Such interference is one of a variety of possible interference from other signals on the same channel, so is called co-channel interference. The present invention addresses demodulating a signal in the presence of such co-channel interference as well as other interference and noise. A figure of merit by which one can evaluate such a system is how well one can pick up the desired signal, compared to the strength of the interference sources.

As in Our Co-Pending Applications, the present invention augments a wireless communication system with multiple antennas, thereby introducing multiple versions of each signal, each of these versions comprising the composite of all the co-channel signals together with interference and noise. With multiple antennas, the relationship in both amplitude and phase of a signal of interest to the interfering co-channel signals will be different in each of the antenna signals (each of the m signals in an m antenna system) due to geometric considerations, both because the antennas are separated by some distance, and, in some cases, because the different sources also are separated. In application to cellular communication systems, the use of multiple receiving antennas is predicated upon the fact that the various base stations' antennas are not co-located, nor are the sources.

Spatial processing of the (complex valued) m signals at the m antennas comprises for each signal of interest determining a weighted sum of the antenna signals. The complex valued weights can be represented by a vector called herein a weight vector. The more general situation is that the received antenna signals need also to be temporally equalized, and in that situation, rather than a weighted sum, for each signal of interest, a sum of convolutions of the antenna signals is determined. That is, the weight vector is generalized, for the linear time invariant equalization situation, to a vector of complex valued impulse responses. For the purposes of this invention, the term weight vector shall apply either to a vector of complex weights or to a vector of impulse responses, depending on whether temporal equalization is included.

Several techniques, including some of the techniques described in Our Co-Pending Patent Applications, have been proposed for receiving signals in the presence of co-channel interference using antenna arrays and using available or estimated spatial information. The method of the present invention does not require prior spatial knowledge, but exploits temporal information, in particular the modulation format of the incoming signal. Exploiting the modulation format in the presence of interfering signals of other modulation formats is relatively easy and there are many known methods that do this. The method of the present invention exploits the fact that the signal of interest has a particular modulation format, and works not only in the presence of such interfering, but also in the presence of interfering signals which have the same modulation format. That is, when there is also co-channel interference.

Prior art techniques do exist that separate and demodulate signals in the presence of co-channel interference and that exploit the fact that one has a particular modulation format. They have been proposed in published papers, for example: A. van der Veen and A. Paulraj, "A constant modulus factorization technique for smart antenna applications in mobile communications," in *Proc. SPIE, "Advances Signal Processing Algorithms, Architectures, and Implementations V"* (F. Luk, ed.), vol. 2296, (San Diego, Calif.), pp. 230–241, July 1994; S. Talwar and A. Paulraj, "Recursive algorithms for estimating multiple co-channel digital signals received at an antenna array," in *Proc. Fifth Annual IEEE Dual Use Technologies and Applications Conference*, May 1995; S. Talwar, M. Viberg and A. Paulraj, "Blind estimation of multiple co-channel digital signals arriving at an antenna array," in *Proc. 27th Asilomar Conference on Signals, Systems and Computers*, volume I, pp. 349–342, 1993; and A. L. Swindlehurst, S. Daas and J. Yang, "Analysis of a decision directed beamformer," *IEEE Transaction on Signal Processing*, vol. 43, no. 12, pp. 2920–2927, December 1995. As will be described more fully below, these published techniques may not work in practice because of implementation problems. That is, they do not tend to take into consideration the "real world" properties of signals.

These prior art techniques sometimes are called property restoral techniques because they force any estimates of signals of interest to have certain modulation formats or other structural properties that the actual signals are known to possess. For example, constant modulus techniques are known that use modulation schemes that have constant amplitude, and exploit that property. In addition to the implementation problems stated above, constant modulus techniques are not applicable to common modulation schemes that are not constant modulus, such as quadrature amplitude modulation (QAM).

The method and apparatus of the present invention also is property restoral, and is applicable to a very wide class of modulation schemes—those that have "finite alphabet." These are modulation formats in which the amplitude and phase of the signal at particular periods of time occupy one of some finite set of options. Many digital modulation techniques have this property. All the uncertainty in such a signal's value at any time is due only to synchronization and which symbol of the finite alphabet was transmitted. The preferred embodiment uses π/4 differential quaternary (or quadrature) phase shift keying (π/4 DQPSK), but the invention is applicable to any finite alphabet modulation.

A prior-art property restoral technique using an array of m antennas to give m received antenna signals from p original signals transmitted with a known digital modulation scheme is to recursively carry out the following steps to separate and demodulate a particular signal of interest:

a) Starting from some demultiplexing weight vector for the signal, form a new estimate of the signal of interest from the arriving antenna data;

b) demodulate the new estimate of the signal to obtain an estimate of the transmitted symbols;

c) from the estimate of the symbols transmitted, form a reference signal which is the closest estimate of the signal that was actually transmitted (that is the signal that has the known modulation format); and d) once one has a reference signal, determine the necessary spatial demultiplexing weight vector for the signal, that is, solve for that combination of the received signals at the antennas which most closely resembles the reference signal (step 1 again).

In this way, starting from some initial point, one recurses until one obtains a "very good" set of transmitted symbols and a "very good" set of spatial demultiplexing weights to apply to the antenna outputs to produce a "very good" estimate of the reference signal.

Prior art techniques that perform these steps include those of the references listed above. The recursion sometimes is called alternating projections in the literature because if one considers the set of demultiplexing weights as a complex valued vector $w_r$, the recursion can be described as: starting with an estimate for $w_r$, project this into reference signal space to get a better estimate of the reference signal, and project the better estimate of the reference signal into $w_r$-space to get a better estimate of $w_r$, and iterate back and forth between $w_r$-space and reference signal-space until one obtains a "very good" $w_r$ that produces a "very good" estimate of the reference signal.

The starting value, either in $w_r$ space or in reference-signal space, first needs to be determined. As would be clear to one of ordinary skill in the art, either value is sufficient, because if one has a good guess at a reference signal, one can get a next better guess at $w_r$, and conversely, if one has a good guess at a $w_r$, one can generate a better guess at a reference signal. The prior art literature on alternate projection methods suggests that one could start with some estimate using such prior art methods as ESPRIT or MUSIC, and use this estimate as a starting point to the general recursion. There are other known ways to obtain a starting $w_r$. For example, one can use well-known maximum ratio combining to get a starting $w_r$, or well-known principal component copy techniques to get a starting $w_r$. Using such techniques gives a starting $w_r$ that usually causes convergence upon the strongest signal. Thus, if the goal is to always pick out the strongest signal from a set of interferers, then such techniques work fine. However, such prior art techniques do not in general work well when one has a low carrier to interference ratio (C/I) as is the case when one has strong co-channel interference.

Our Parameter Estimation Invention discloses a technique for finding a starting $w_r$ estimate that extracts a signal that is not necessarily the strongest signal and that works well in the presence of strong co-channel interference.

In addition, prior art techniques for using a starting $w_r$ and then carrying out the alternating projections require, in order to work properly, that one first correct for any frequency offset and that one first align (synchronize) in time.

The frequency offset problem can be described as follows. In a typical radio-frequency (RF) receiver, the original RF signal is mixed down using local frequency references, typically produced by crystal oscillators and/or frequency synthesizers, to produce a baseband signal whose phase and amplitude changes around in a predictable pattern determined by the modulation format. Ideally, the signal has no residual frequency offset component, such an offset due for example to frequencies of the local oscillators differing slightly from the frequency of the oscillators used in sending the signals. In the case of mobile communications transmitting from a handset to a base station, the frequency of the radio signal is produced by a local oscillator in the hand set, while the frequency references used for down-converting the signal are produced by different local oscillators in the base station. Although the base station local oscillators typically are very good, there still typically is frequency offset in the residual signal.

The alignment problem is to synchronize exactly the initial timing of the symbols in the signals sent and the signals received in the base station. There are a number of techniques in the prior art for performing the alignment. Such techniques often use known training sequences that are incorporated in the burst of interest. These training sequences are chosen to have particular correlation (or convolution) properties. A correlation (or convolution) operation can then be used to determine timing offset, as is known in the art. The problem with such techniques is that they do not perform well in the presence of high co-channel interference.

Our Parameter Estimation Invention discloses technique for finding the starting time alignment and starting frequency offset that works well in the presence of strong co-channel interference.

In addition to the starting weight vector determining problem and initial alignment and frequency offset problem, prior art alternating projection methods also suffer from time alignment (synchronization) problems and frequency offset problems on an ongoing basis. First, the step of going from a reference signal to a next guess at $w_r$ is very sensitive to having the reference signal and the received signals at the antennas lined up correctly in time. If they are lined up incorrectly, then the $w_r$ one estimates may not be useful. In addition, in the step of projecting from a reference signal into a next better guess at a $w_r$ vector, there typically is a small frequency difference between the reference signal that one uses in the projections, and the frequency of the actual signals one is solving for. Such an offset can completely throw off the $w_r$ estimate. In the phase space, such small frequency differences gradually accumulate over time, so that after only a few symbols are transmitted, a large fraction of a cycle may be accumulated. Thus, the complex-valued solution for what phase one should apply to a particular signal gets totally thrown off. Thus, the straightforward solution of generating a new $w_r$ from a current reference signal is very sensitive to small frequency offsets.

Thus there is a need in the art for demodulation and signal separation techniques that are insensitive to the frequency offset and time alignment problems, and that work well in the presence of high level of co-channel interference. There is also a need in the art of improving alternating projection techniques by including time alignment and frequency offset estimation on an ongoing basis, such estimation working well in the presence of strong co-channel interference. Thus there is also a need in the art for improving the step of generating a reference signal (projecting onto signal reference space) in such alternating projections method, such improvement reducing the frequency offset and alignment problems in such reference signals.

Frequency offset is primarily a problem in finite alphabet modulation formats that include a phase difference between the symbols in the alphabet. This includes all phase shift keying (PSK) systems and many QAM systems. There are also modulation formats, including AM and QAM systems, which are sensitive to amplitude errors. In the alternating projections step for such systems, amplitude error creep may become a problem. That is, erroneous results may occur if one does not take into account the amplitude errors between a reference signal and the actual signal. Thus there is also a need in the art for improving the step of generating a reference signal (projecting onto signal reference space) in such alternating projections method, such improvement reducing the amplitude offset in such reference signals.

The method and apparatus of the present invention does not suffer from these problems. Our method includes projecting signals close to the actual, not ideal signals, in the presence the above described problems. The method is applicable to all finite alphabet modulation formats.

Producing better reference signals which are insensitive to frequency offset, time alignment and/or amplitude offset errors is applicable not only to alternating projection methods used in demodulation, but also to all processing of signals which require producing a reference signal, such as many adaptive filter processing, decision feedback equalization systems, etc.

II. SUMMARY OF THE INVENTION

A. Objects of the Invention

An object of the present invention is to provide a method and apparatus for demodulation that is relatively insensitive to frequency offset and time alignment problems and that work well in the presence of co-channel interference.

Another object of the present invention is to provide an improved alternating projection method that including time alignment and frequency offset estimation on an ongoing basis, such estimation working well in the presence of co-channel interference.

Another object of the present invention is to provide an improved method for generating a reference signal which has reduced frequency offset and alignment problems.

Another object of the present invention is to provide an improved method for generating a reference signal which has reduced amplitude offset.

B. Overview of the Invention

The above and other objects of the invention are provided for in a base station-implemented method for generating a reference signal, the base station part of a wireless communication system which includes at least one base station and at least one remote terminal, the base station including an array of antennas. The reference signal is modulated at symbol points by a modulation scheme that has a finite symbol alphabet. Each antenna of the array receiving a corresponding received signal, all the received signals forming a received signal vector, each received signal includes signals from all the remote terminals that are transmitting. The method includes a signal copy operation using a spatial weight vector to separate from the received signal vector a remote terminal copy signal and, for each sample point, (a) constructing an ideal signal from the remote terminal copy signal, the ideal signal having the modulation scheme, with the ideal signal at the initial symbol point set to be equal to the remote terminal copy signal at the initial symbol point; and (b) relaxing the ideal reference signal towards said terminal copy signal, producing the reference remote terminal transmission signal. In one embodiment, the alphabet of said modulation scheme includes symbols that have different amplitudes and the step of relaxing relaxes the amplitude of the ideal signal towards the amplitude of the remote terminal copy signal. In another embodiment, the modulation scheme includes phase shift keying, and the step of relaxing relaxes the phase of the ideal signal towards the amplitude of the remote terminal copy signal. In another embodiment.

Also disclosed is a base-station implemented method for demodulating a modulated signal transmitted by a particular remote station in a wireless communication system including at least one base station and at least one remote terminal, the base station including an array of antennas. The modulated signal is assumed modulated by a finite symbol alphabet modulation scheme. Each distinct antenna of the array of antennas receives a corresponding received signal, all the received signals forming a received signal vector. Each received signal includes signals from all the remote terminals that are transmitting. The method includes the steps of down-converting the received signals; estimating the time alignment and frequency offset of the received signal vector; using an initial spatial weight vector to separate from the received signal vector a remote terminal copy signal, the separating including correcting for time alignment and frequency offset using the estimated time alignment and frequency offset, to form a corrected terminal copy signal; demodulating the corrected terminal copy signal to produce a demodulated signal; then performing at least once the steps of (a) synthesizing a reference signal from the demodulated signal; computing a new spatial weight vector by minimizing a prescribed cost function which is dependent on the reference signal; and (b) repeating the separating and demodulating steps above, using the last determined new spatial weight vector instead of the initial spatial weight vector for separation. The demodulated signal is then output.

In one variation, the separating step includes applying the estimated time alignment and frequency offset as corrections to the received signal vector to form a corrected signal vector; and separating from the corrected signal vector the corrected terminal copy signal by using the initial spatial weight vector corresponding to the particular remote terminal.

In another variation, the separating step includes separating from the received signal vector a terminal copy signal corresponding to the particular remote terminal by using the initial spatial weight vector corresponding to the particular remote terminal; and applying the estimated time alignment and frequency offset as corrections said particular terminal copy signal to form a corrected terminal copy signal.

III. BRIEF DESCRIPTION OF THE DRAWINGS

FIG. 2 shows a diagram of the burst used to perform synchronization in the preferred embodiment of the invention.

IV. DESCRIPTION OF THE PREFERRED EMBODIMENT

A. System Architecture

Figure 1:
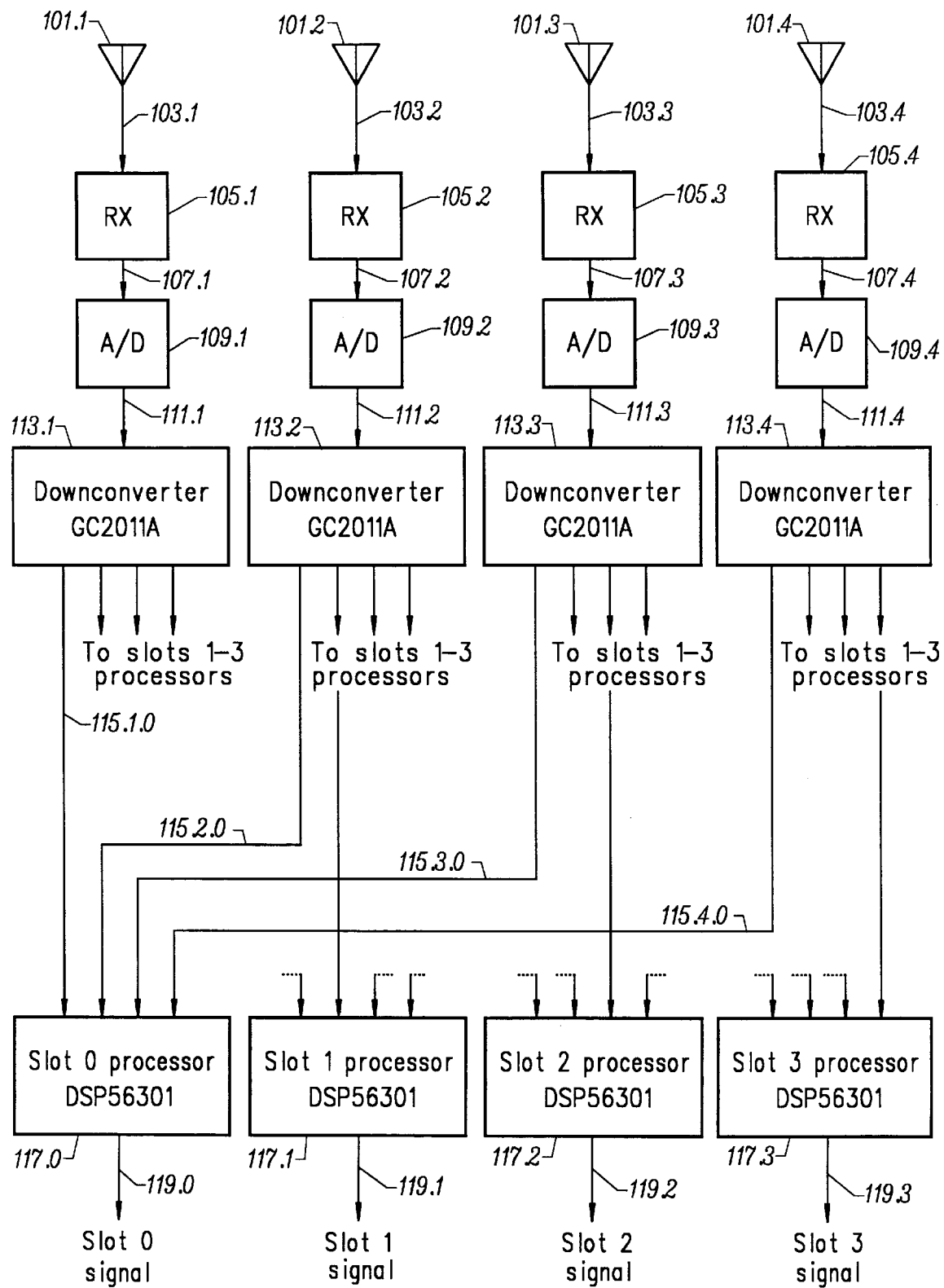
FIG. 1 shows the architecture of the preferred embodiment of the apparatus of the present invention.

The various preferred and alternate embodiments of the present invention are for incorporation in a cellular system using the "Personal Handyphone System" (PHS), ARIB Standard, Version 2 (RCR STD-28). In particular, the preferred and alternate embodiments of the present invention are incorporated in combination with the preferred embodiment of Our Demodulation Invention.

The PHS system is an 8 slot time division multiple access (TDMA) system with true time division duplex (TDD). Thus, the 8 timeslots are divided into 4 transmit (TX) timeslots and 4 receive (RX) timeslots. The frequency band of the PHS system used in the preferred embodiment is 1895–1918.1 MHz. Each of the 8 timeslots is 625 microseconds long. The PHS system has a dedicated frequency and timeslot for a control channel on which call initialization takes place. Once a link is established, the call is handed to a service channel for regular communications. Communication occurs in any channel at the rate of 32 kbits per second (kbps), called full rate. PHS also supports half rate (16 kbps) and quarter rate (8 kbps) communications.

In PHS used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec. In order to support half rate and quarter rate communication, the PHS standard defines a PHS frame as four groups, that is, four complete cycles of the eight timeslots. In the embodiments described herein, only full rate communication is supported, so that in this description, the term frame shall be synonymous with the PHS term group. That is, a frame is 4 TX and 4 RX timeslots and is 5 msec long. The details of how to modify the embodiments described herein to incorporate less than full rate communication would be clear to those of ordinary skill in the art.

A logical channel is a conceptual pipe through which messages are exchanged between a remote terminal and the base station. Two types of logical channels exist, logical control channels (LCCH) involved in initializing a communications link, and service channels (SCH) involved in ongoing communications. The preferred embodiments of the present invention applies to communications in the service channels. Here, any particular remote terminal and a base station communicate in bursts in timeslots that are a frame apart.

Frame timing is the start and stop timing of the frames. During call initialization, the remote terminal listens to a control channel called the broadcast control channel (BCCH) of the base station to synchronize itself to the frame timing of the base station. To initialize a call, the base station and the remote terminal communicate on a control channel to establish the timeslot and frequency for the service channel. Once the particular service channel is agreed upon, the base station and remote terminal enter synchronization ("SYNCH") mode over the service channel during which each sends to the other known synchronization bursts ("SYNCH" bursts).

The preferred embodiment of the method and apparatus of this invention uses this SYNCH burst to determine an initial estimate of time alignment and an initial estimate of this frequency offset. This is necessary because in practice, the RF frequency of a remote terminal may be offset relative to the base station carrier by as much as ±5 kHz or more. An initial spatial processing weight vector also is determined during SYNCH mode.

Once alignment and frequency offset is estimated, "normal" mode for communications is entered. During normal mode, the method and apparatus of this invention continues to compensate for frequency offset and alignment and continually updates estimates of frequency offset, alignment, and the weight vector.

The PHS system uses $\pi/4$ differential quaternary (or quadrature) phase shift keying ($\pi/4$ DQPSK) modulation for the baseband signal. The baud rate is 192 kbaud. That is, there are 192,000 symbols per second.

Constellation space is the complex constellation swept out by the complex valued (in-phase component I and quadrature component Q) baseband signal. For π/4 DQPSK, the signal constellation space consists of constellation points every 45 degrees around the unit circle starting for convenience at I=1 (normalized) and Q=0, denoted as (1, 0). In practice, the constellation points deviate from the ideal by interference, multipath, additive noise, slow rotations due to frequency offsets, and by the frequency response and non-linearities of the radio receivers and transmitters in the system. Differential space is the complex space describing changes in phase from symbol to symbol. That is, it is the complex space swept out by the differential signal which is formed by dividing each constellation space point by the previous constellation space point. For π/4 DQPSK, the differential space signal in theory consists only of the four points with phases +π/4, −π/4, +3 π/4, and −3 π/4. In practice, actual differential space signals may be distorted due to interference, noise, channel distortion, frequency offset, and time alignment problems.

In the PHS system as used in the preferred embodiment, the RF signal undergoes spectral shaping, typically raised square root or raised cosine filtering. The resultant baseband signal then only passes through ideal constellation points during brief instants in time during each symbol period. In the preferred embodiment, the baseband signals are sampled at a rate of eight times the baud rate. That is, the sampling rate is 1.536 MHz for eight samples per symbol. For correct demodulation, the method and apparatus of the present invention estimates which of the 8 samples for each symbol comes closest in time to the instantaneously ideal constellation point. This process of finding the sample that is closest to the ideal constellation point is called sample alignment.

The architecture of the preferred embodiment of the apparatus of the present invention is shown in FIG. 1. A plurality of m antennas $101.1, \ldots, 101.m$ is used, where m=4. The outputs of the antennas are mixed down in analog by RX blocks $105.1, \ldots, 105.m$ in three stages from the carrier frequency (around 1.9 GHz) to a final intermediate frequency (IF) of 384 kHz. This signal then is digitized (sampled) by analog to digital converters $109.1, \ldots, 109.m$ at 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. This is equivalent to multiplying by the complex sequence 1, j, −1, −j, which is easily implemented using sign changing and re-binning. The result is a complex valued signal that contains the complex valued baseband signal plus an image at −2×384=−768 kHz. This unwanted negative frequency image is filtered digitally to produce the complex valued baseband signal sampled at 1.536 MHz. In the preferred embodiment, GrayChip Inc. GC2011A digital filter $113.1, \ldots, 113.m$ devices are used, one for each antenna output, to implement the down-converting and the digital filtering, the latter using finite impulse response (FIR) filtering techniques. Determining the appropriate FIR filter coefficients is done using standard techniques as would be clear to a person of ordinary skill in the art.

There are four downconverted outputs from each antenna's GC2011A digital filter device 113, one per time slot. For each of the four timeslots, the four downconverted outputs from the four antennas are fed to a digital signal processor (DSP) device 117 for further processing according to this invention. In the preferred embodiment, four Motorola DSP56301 DSPs are used, one per receive timeslot.

The following notation is used herein.

Let $z_1(t), z_2(t), \ldots, z_m(t)$ be the complex valued responses of the first, second, ..., m'th antenna elements, respectively, after down-conversion, that is, in baseband. These can be represented by an m-vector z(t) with the i'th row of z(t) being $z_i(t)$. Consider N digital samples of z(t) denoted by $z(T), z(2T), \ldots, z(NT)$, where T is the sampling period. For simplicity and convenience, the sampling period will be normalized to 1 and z(t) (and other signals) will denote either the function of continuous time t or the sampled signal, which case being clear from the context to one of ordinary skill in the art. The N samples of z(t) can be expressed as a matrix $Z=[z(1)|z(2)|\ldots|z(N)]$. Suppose that p complex valued co-channel signals $s_1(t), s_2(t), \ldots, s_p(t)$ from p distinct sources (remote terminals) are sent to the antenna array. In that case, the $z_i(t), i=1, \ldots, m$ at the m antenna array elements are each some combination of these p signals, together with noise and other interference. The particular combination depends on the geometry and propagation. Let the co-channel signals be represented by p-vector s(t) whose k'th element is complex valued signal $s_k(t)$.

The signal $s_k(t)$ can be modeled as $$s_k(t) = \Sigma_n b_k(n) g(t - nT_s),$$

where the summation $\Sigma_n$ is over index n for all values of n in a data batch or burst, $\{b_k(n)\}$ is the symbol sequence sent by the k'th remote terminal, $T_s$ is the symbol period, and g(t) represents the impulse response combining the effects of any transmit filter(s), the propagation channel, and any receive filter(s) used. g(t) is made unit-energy for convenience. In the preferred embodiment, the symbol period $T_s$ is taken to be an integer multiple L of the sample period T, where L=8. Since T is normalized to 1, $T_s = L = 8$. The complex valued symbols $b_k(n)$ belong to some finite alphabet Ω. For the π/4 DQPSK modulation of the PHS embodiment, $\Omega = \{1, \exp \pm j \pi/4, \exp \pm j \pi/2, \exp j \pi, \exp \pm j 3 \pi/4\}$, and for any k or n, the phase of the differential signal $d_k(n) = b_k(n)/b_k(n-1)$ belongs to finite alphabet $\{\pm \pi/4, \pm 3 \pi/4\}$.

Denoting matrix S as having columns corresponding the same N samples of s(t) as in Z, the aim of demultiplexing is to produce some estimate of S. A linear estimate is taken. That is $$\hat{S} = W_r^H Z$$

where $W_r$ is a m×p matrix called the weight matrix and $W_r^H$ is the complex conjugate transpose, that is, the Hermitian transpose of $W_r$. The r subscript in $W_r$ refers to "receiver" to indicate we are dealing with reception rather than transmission. The k'th column of $W_r$, m-vector $w_{rk}$, is called the weight vector for the k'th signal $s_k(t)$. Thus the estimate of $s_k(t)$ is $$\hat{s}_k(t) = w_{rk}^H z(t).$$

In this invention, we shall be describing how to demodulate the signal sent from such one particular remote terminal k in the presence of the other signals from remote terminals j, j≠k, that is, in the presence of co-channel interferers. For convenience, the notation shall be simplified so that the subscript k shall be implicit. It would be clear to one in the art that the operations for this one signal would be repeated for signals from the other (p−1) signals using the complete operation shown in the matrix equation above.

By a signal copy operation we mean the operation $$\hat{s}(t) = W_r^H z(t).$$

to estimate particular samples of a particular signal from samples (in t) of the m received signals z(t) using the weight vector $w_r$.

A reference signal is a signal that has the required modulation structure. That is, a signal of the structure $$s_R(t) = \Sigma_n b(n) g(t+\epsilon-nT_s)$$

where $\epsilon$ is the timing error. In the case of the preferred embodiment, $s_R(t)$ is a $\pi/4$ DQPSK waveform.

B. SYNCH Mode Operation

The purpose in SYNCH mode is to obtain an initial estimate of the complex valued weight vector $w_r$ for the signal of interest, and to obtain initial estimates of the alignment and offset frequency offset. The method (and apparatus) of the present invention uses an alignment and frequency offset estimation technique that exploits the finite alphabet properties of the signal. Details are provided herein for a particular signal of interest, and the other signals received are co-channel interferers. The details are clearly applicable to receiving any of the co-channel signals, and how to describe the method, for example using matrix notation, for simultaneously receiving all co-channel signals would be clear to one of ordinary skill in the art.

The SYNCH burst used in the preferred embodiment has a known format. FIG. 2 is a diagram of the burst used to perform synchronization. Note that the SYNCH burst has several fields, and one is free to use all or any of the fields of the burst or part of a field. The first field is called the preamble and is a particular periodic bit sequence. The Fourier transform (estimated using an FFT calculation) of this particular field reveals that there are three strong sinusoidal components, and one alternative embodiment of the method uses this fact. The preferred embodiment determines a cost function, in particular the squared error, and uses an optimization method, in particular least squares optimization, to determine the parameter value that minimizes the cost function. Other cost functions and optimization methods may be used without deviating from the scope of this invention. The first parameter thus determined is the time alignment, a time shift (expressed as a number of samples) that gives the minimum cost function. Once the time alignment is estimated, it is used in determining a cost function which is related to the initial $w_r$ and frequency offset, and an optimization method is used to determine the initial $w_r$ and frequency offset estimates.

The position in time is approximately known. In the first preferred embodiment, it is assumed that initially the position in time of the burst is known to within ±2 symbols (±16 samples), and alignment is estimating the position of the burst within this window of 32 samples. A single SYNCH is used for alignment, first to estimate the rough position and then to estimate the more accurate position in time. Once alignment is determined, the same SYNCH burst is used to estimate the frequency offset and the initial weight vector $w_r$. In an alternate embodiment, when a slower processor is used for the estimation, so that time of calculation is more critical, three bursts are used in total. Two bursts are used for alignment, the first to estimate the rough position and the second to estimate the more accurate position in time. Once alignment is determined, in the third embodiment with a slower processor, a third SYNCH burst is used to estimate the frequency offset and the initial weight vector $w_r$.

Figure 3:
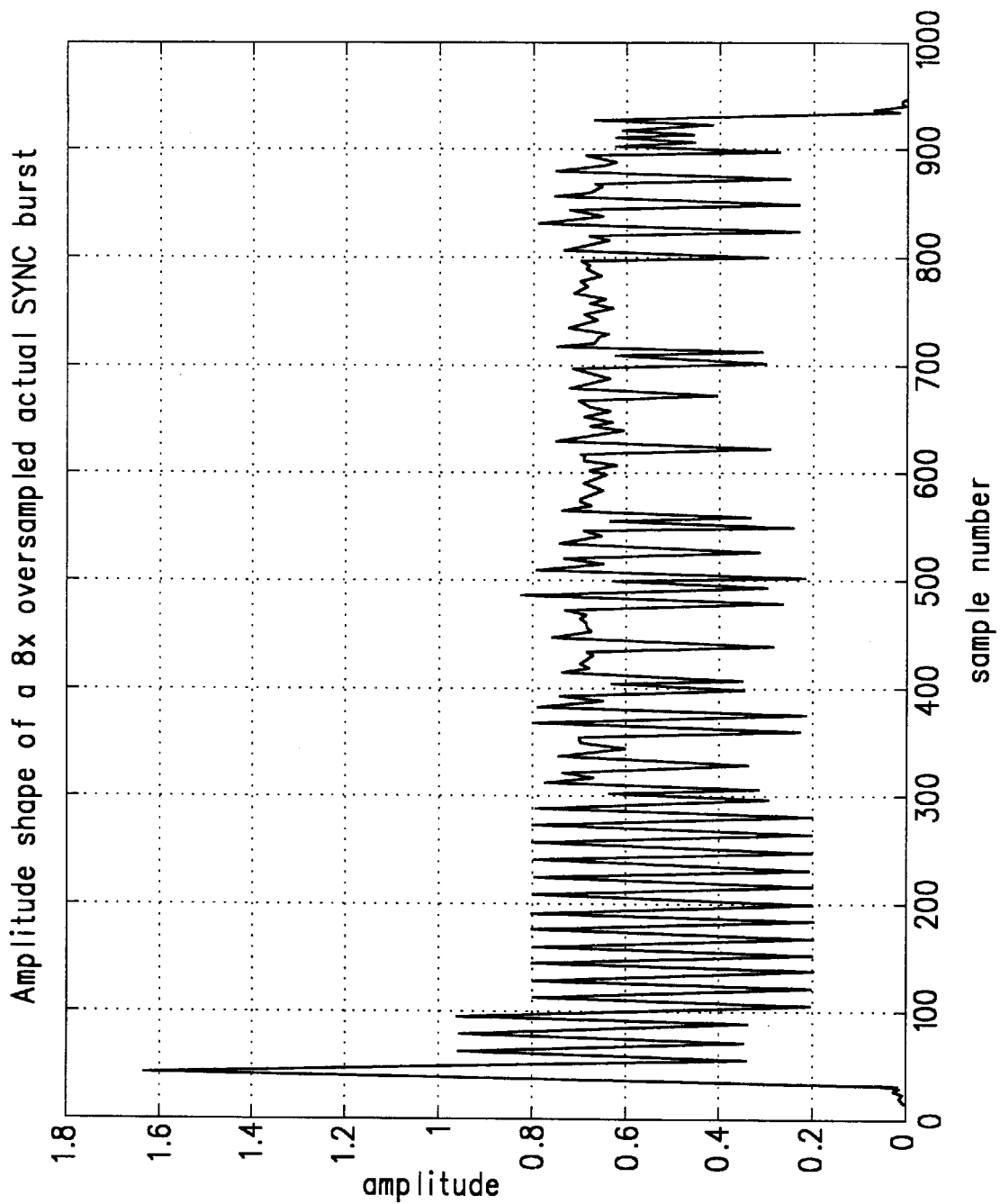
FIG. 3 shows the amplitude (magnitude) of a SYNCH burst used in the preferred embodiment of the invention.

Time alignment estimation is now described in more detail. Only amplitude, not complex valued data, is used for this. FIG. 3 shows the amplitude (magnitude) of a SYNCH burst. As would be expected, it was observed looking at several such SYNCH bursts having different frequency offsets that this amplitude signal (amplitude vs. time) does not vary significantly between SYNCH signal bursts with different frequency offsets. Although in a broad sense, the known property used in this embodiment is the known bit sequence of the SYNCH burst, in a narrower sense, it is a known property that the amplitude signal does not vary significantly with frequency offset that is exploited in determining the time alignment in the particular implementation. Other variations of the method would be clear to one in the art for cases when the magnitude characteristics do change with frequency offset.

Figure 4A:
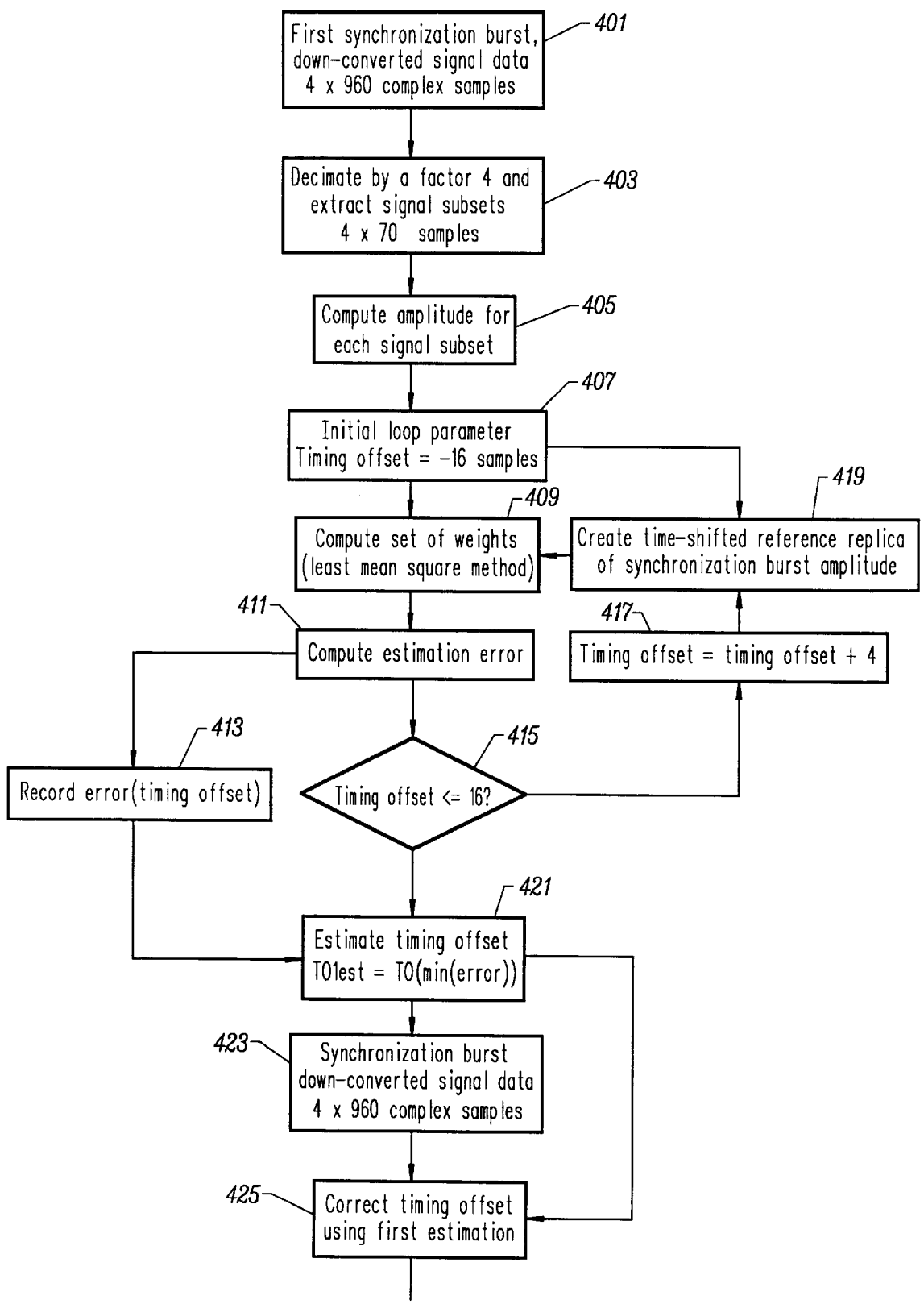
FIGS. 4A–4C show a flow chart of the alignment method according to the preferred embodiment of the invention.
Figure 4B:
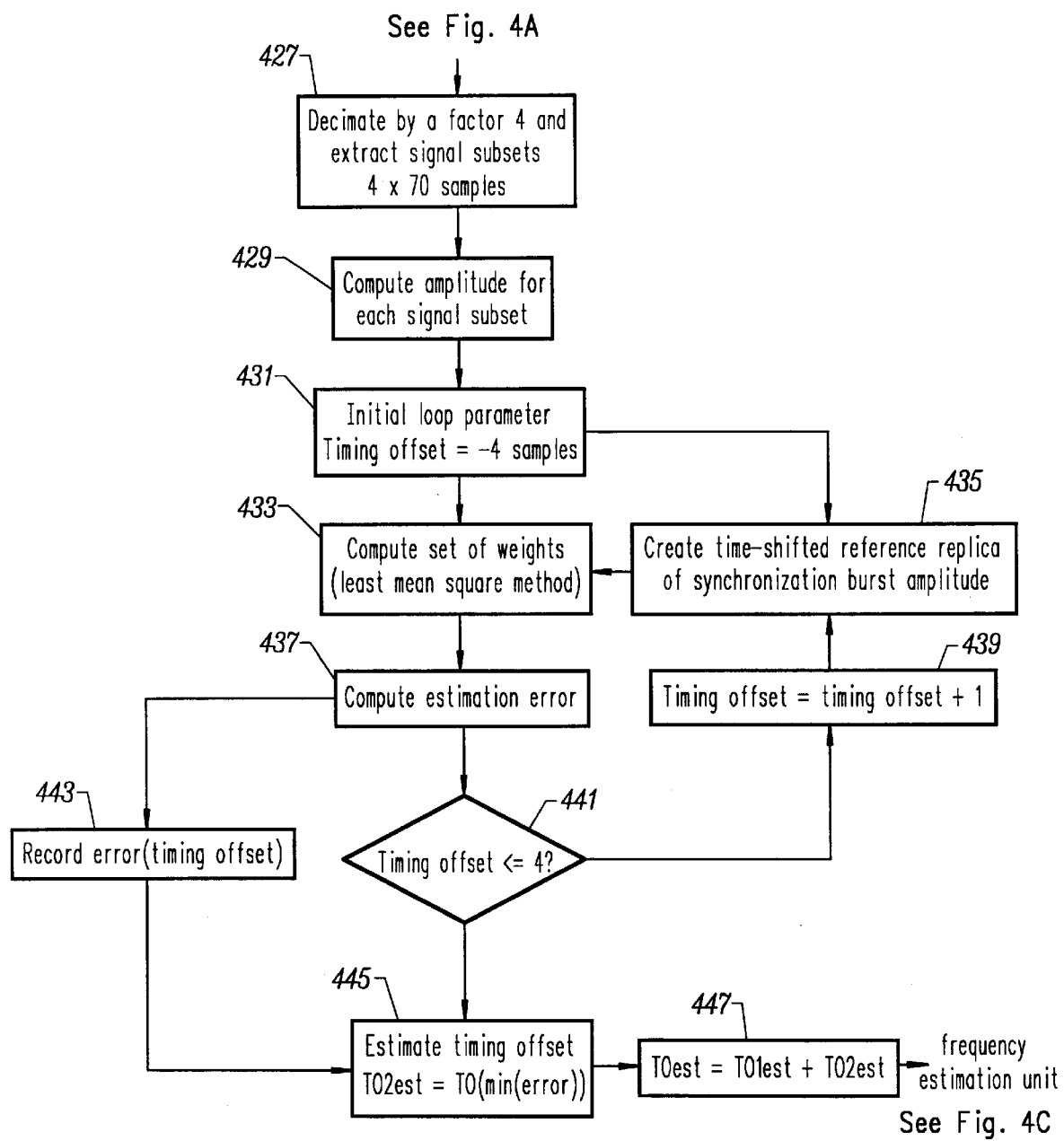
Figure 4C:
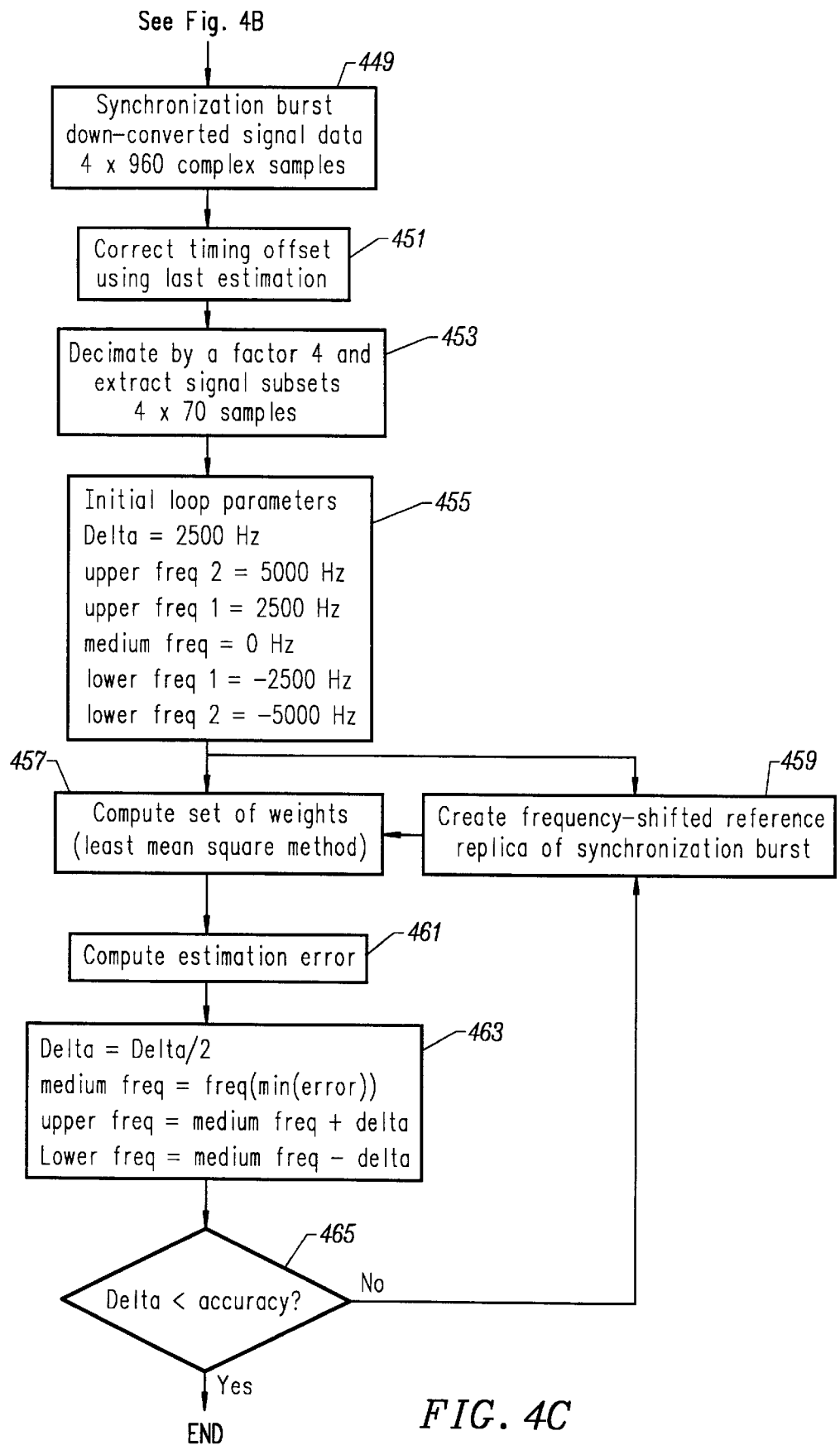

FIGS. 4A–4C show a flow chart of the method according to the first preferred embodiment. The method starts at step 401 with a down-converted burst of m signals $z_1(t), \ldots, z_m(t)$, where m=4.960 complex valued samples are taken at each antenna. Since the signal is oversampled at 8 times the baud rate, it is decimated by a factor of 4 in step 403 down to the frequency of two samples per symbol.

Only a part of the burst is used in the method. In the preferred embodiment, referring to the amplitude of a typical burst shown in FIG. 3, a single area starting around the middle of the PREAMBLE field (sample numbers 6–67) in the SYNCH burst is used to make a subset of the burst. In the flowchart of FIG. 4, Step 405 is the taking of the subset. Other variations of the subset structure include using any numbers of areas, or, indeed, the entire burst.

A loop to determine the weight vector and alignment is now commenced in step 407 in which it is assumed that the time offset is within. The weight vector in this loop is computed for the purpose of determining the time offset within the window in step 409. There are four copies of the incoming signal (and subsets), one for each antenna. Denote these subsets of signals by complex valued row vectors, each row vector being of the time samples of the subset for the particular antenna. Let m×N matrix $|Z|^2$ represent the amplitude squared of the time samples corresponding to the respective subsets of the signals at the m antennas. That is, define $|z|^2(t)$ as the m-vector whose i'th element is $|z_i(t)|^2$, the squared magnitude of the signal subset at the i'th antenna at time sample t, where t is over the subset being considered. Then define $$|Z|^2 = [|z|^2(1) |z|^2(2) \ldots |z|^2(N)].$$

Figure 5:
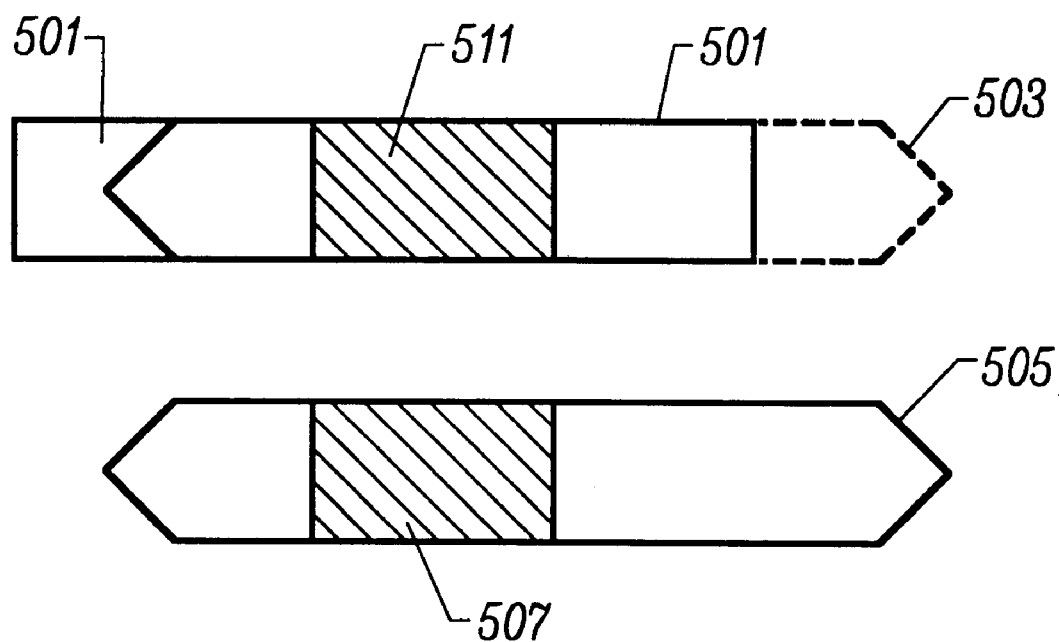
FIG. 5 shows the alignment window and the subset of the SYNCH burst considered in the preferred embodiment of the initial alignment and frequency offset estimator.

One considers a linear combination of these $|z_i(t)|^2$s with real valued weights $w_1, w_2, \ldots, w_m$, and forms a cost function which compares this linear combination to the known magnitude squared of same subset in the known SYNCH burst. FIG. 5 illustrates the subset made up of area 511 for the SYNCH burst 503 within the window 501, and the subset of the corresponding area 507 for the reference SYNCH burst 505. The reference SYNCH burst, a signal, is kept in read only memory (ROM). Denote the magnitude squared of the reference SYNCH burst in subset 507 by $|s_r|^2(t)$ and let row vector $|s_r|^2$ be the samples of the magnitude squared of the reference burst 505 in area 507. That is $$|s_r|^2 = [|s_r(1)|^2 |s_r(2)|^2 \ldots |s_r(N)|^2].$$

Define column m-vector $wr_r$ as having real valued weights $w_1, w_2, \ldots, w_m$ as its elements. Define the signal copy operation on $|z|^2(t)$ as determining the copy signal $w_r^T |z|^2(t)$. Then the optimization in step 409 is to find that $w_r$ that brings the copy signal $w_r^T |z|^2(t)$ as close as possible (in some norm) to the known $|s_r|^2(t)$. In the preferred embodiment, the cost function $$J = \| |s_r|^2 - w_r^T |Z|^2 \|^2$$

is minimized. Optimization techniques for finding the $w_r$ that minimizes such J are well known in the art. See for example, G. H. Golub and C. F. Van Loan, *Matrix Computations*, 2nd ed., Baltimore: John Hopkins University Press, 1989, B. N. Datta, *Numerical Linear Algebra and Applications*, Pacific Grove, Calif.: Brooks/Cole, 1995 (Section 6.10), or W. H. Press, et al, *Numerical Recipes in C*, 2nd ed., Cambridge, UK: Cambridge University Press, 1992 (Chapter 10).

The literature on such methods solves matrix optimization problems with cost functions of the form $J=(b-Ax)^H(b-Ax)$. To translate to the present case, one makes the substitutions $b^T=|s_r|^2$, $A^T=|z|^2$, and $x^T=w_r$. Note that the notation b (and A and x) used here for "generic" vectors have no relationship to the symbols $b_k(n)$, $b(n)$, $b_0(n)$, etc., used elsewhere herein.

Two alternate methods are used in two different implementations for solving the optimization problem. The first is the conjugate gradient method. This minimizes $f(x)=½ x^H A x - x^H b$. The function has a minimum value of $-½ b^H inv(A) b$ for $x=inv(A)b$, where $inv(A)$ is the pseudoinverse of A. The minimization is carried out by generating a set of search directions $p_k$. At each stage, denoted by index k, a quantity $a_k$ is found that minimizes $f(x+a_k p_k)$ and $x_{k+1}$ is set equal to $x_k + a_k p_k$. The vector $p_k$ is chosen such that the function $f(.)$ is minimized over the entire vector space spanned by $\{p_1, p_2, \ldots, p_k\}$.

The following is the procedure used for finding the pseudoinverse using conjugate gradients.

```
x = 0;
s_k = b;
for k = 1:4
    r_k = s_k A^H;
    if(k = 1)
        p_k = r_k;
        l_r = r_k(:)^H r_k(:);
    else
        r_k OldLen2 = l_r;
        l_r = r_k(:)^H r(:);
        b_{k-1} = l_r/r_k OldLen2;
        p_k = r_k + p_k b_k;
    end
    q_k = p_k A;
    a_k = l_r/q_k(:)^H q_k(:);
    x = x + a_k p_k;
    s_k = s_k — a_k q_k;
end
```

The second method used for finding the pseudoinverse is by formally calculating the pseudoinverse which minimizes the L2 norm of the system of equations Ax-b, that is, which minimizes $$J=(b-Ax)^H(b-Ax).$$

The value of x that minimizes the J is $(A^H A)^{-1} A^H b$ and the minimum value of J is $b^H b - b^H (P-I) b$, where $P=A(A^H A)^{-1} A^H$ is called the projection matrix of A and $(A^H A)^{-1} A^H$ is the pseudoinverse of A.

The advantage of this technique over conjugate gradient method is when this optimization is needed to be computed several times for different values of b ($s_{ref}$ in the case of this invention), the computation of the pseudoinverse $(A^H A)^{-1} A^H$ of A does not depend on b, and thus need only be carried out once for any A, which, in the case of the present invention, means once for any received signal z. In the case of using conjugate gradients, each minimization requires the same computation involving both A and b.

In the preferred embodiment, adaptive normalization is used at each step of the computation. For this, a normalized error term (normalized by $b^H b$) is used. This normalized cost function, denoted by J' is $$J'=J/b^H b = 1 - b^H (P-I) b / b^H b,$$

so that minimizing J' is equivalent to maximizing $b^H(P-I) b/b^H b$. For numerical and stability reasons, determining the pseudoinverse is implemented in the preferred embodiments of the present invention to within a scale factor. P and hence (P-I) are invariant to such a scale factor. In order to avoid having to calculate such a scale factor, in the preferred embodiments, whenever J needs to be calculated for comparison reasons, values of J' are instead determined and compared. See, for example, steps 411 and 421 below.

As a result of such scale factors used in calculating the pseudoinverse, the vector x and hence the weight vector is determined to this scale factor. To avoid having to explicitly calculate this scale reference signals, in this case $|s_r|$, are defined for this scale factor. The particular application of this invention is for weight vectors that are determined for use in signal copy operations and to determine and compare reference signals, all reference signals and signal copy operations are normalized to this scale factor for consistent results.

Returning to the flow chart, once the weights are computed, the estimation squared error in the form of J' is computed in step 411. This error is stored in step 413 together with the timing offset for this $w_r$. Also, in step 415 a check is made to determine if the error has been calculated for all offsets of this loop, which, because of the decimation, is every four samples. If not, in step 417, the decimation factor 4 is added to the offset being determined. That is, window 507 is shifted by 4, and in step 419 and 409, a new set of weights is again determined. In step 411, the new error for this new offset is determined. In this way 9 trials in total are repeated. Thus one ends up with the error as a function of the 9 offsets, these offsets separated by 4 samples. In step 421, the offset $w_r$ that gives minimum squared error J' is selected to give a coarse offset estimate.

The method now moves to the second loop which determines the alignment estimate within the four samples of the coarse estimate. In the preferred embodiment, the same SYNCH burst is used (step 423). In alternate implementations, a second SYNCH burst may be used in order to limit the computational power needed.

The coarse alignment determined is used in step 425 to correct the data received at the antennas during the SYNCH burst period. The received data in step 427 is again decimated and a subset is determined corresponding to area 511. Now a loop is started again which is similar to the coarse alignment determining loop described above, except that rather than considering every four samples for coarse alignment selection, one now looks within the 4 samples determining a fine alignment. The final alignment is determined in step 447 by adding the coarse alignment and the fine alignment estimates.

At this stage, initial time alignment has been estimated. This now is used to estimate the initial frequency offset and weight vector parameters. Again, the same SYNCH burst is used. In alternate embodiments in which the computational power available might be limited, an additional SYNCH burst may be used to estimate the frequency offset and the weight vector $w_r$.

In determining alignment, $|z_i(t)|^2$, i=1, ..., m, the squared magnitudes of the subset of signals at the antennas were used, and $w_r$ had real valued components. For frequency offset estimation and $w_r$ determination, the full complex valued data $z_i(t)$, i=1, ..., m, of the subset of antenna signals is used, and $w_r$ is complex valued. The burst is received in step 449, and corrected for alignment timing offset in step 451 using the alignment estimate determined in step 447.

The signal is decimated by a factor of 4 and the subset is extracted in step 453. The main estimation loop is now started. Five values for frequency offset are used initially in the loop. The difference between each of the 5 points is called delta, and initially set to 2048 Hz. The five points are −4096 Hz, −2048 Hz, 0, +2048 Hz and +4096 Hz. Different implementations may use different values. The main loop is almost identical to above for time alignment estimation, except that the frequency shift that gives us the minimum squared error is computed. Define $z(t)=[z_1(t) z_2(t) \ldots z_m(t)]^T$ and $$Z=[z(1) z(2) \ldots z(N)].$$

One considers a linear combination of these $z_i(t)$'s with complex valued weights $w_1, w_2, \ldots, w_m$. Denote the reference SYNCH burst in subset 507 after frequency offset correction by $s_r(t)$ and let row vector $s_r$ be the samples of the magnitude of the reference burst 505 in area 507 corrected by the frequency offset. That is $$s_r=[s_r(1) s_r(2) \ldots s_r(N)].$$

The frequency shift is applied by multiplying each complex valued sample by a phase shift corresponding to the frequency offset. Define complex column m-vector $w_r=[w_1\ w_2 \ldots w_m]$. Then the optimization in step 457 is to find that $w_r$ that brings the copy signal $w_r^H z(t)$ as close as possible (in some norm) to the known and frequency offset corrected $s_r(t)$. In the preferred embodiment, the cost function $$J=\|s_r - w_r^H Z\|^2$$

is minimized. In this way, the weights $w_r$ that minimize this cost function for each of the 5 frequency offsets are determined. As before, when the pseudoinverse method is used, weights $w_r$ are determined to within a constant. It will be clear to those in the art that in that case, $s_r(t)$ also will be defined with that scaling in mind for consistency. The squared estimation error (normalized as J') for each of these weight vectors $w_r$ is determined in step 461, and then the frequency offset that gave the minimum error is selected. Call this Coarse_Offset_Freq. A binary search is now carried out for three values centered around and including Coarse_Offset_Freq that gave minimum error in the last recursion. with a delta of 1024 Hertz. That is, the weights and errors are determined for (Coarse_Offset_Freq—delta) and (Coarse_Offset_Freq +delta), the two additional frequency offset values around the Coarse_Offset_Freq, and, using a binary search, the frequency offset that gives minimum squared error is selected from the set {(Coarse_Offset_Freq—delta), Coarse_Offset_Freq, (Coarse_Offset_Freq+delta)}. Delta is now halved, and a new binary search is commenced. This binary search loop of halving delta is continued until delta is less than that the required accuracy for the frequency offset. In the preferred embodiment this is 16 Hz.

Two alternate methods also can be used in determining the frequency offset. These techniques, the gradient technique and interpolation, may be computationally more efficient. In the gradient technique, one exploits the observation that the error function curve versus frequency offset is smooth and typically presents two and sometimes three minima. Hence finding the main minimum is very easy using the well known gradient minimization techniques, and requires only a few iterations. The same main estimation loop as used in the binary search method is used to approximate the minimum before starting the gradient search loop. The interpolation method uses a fourth order polynomial. One determines the frequency offset by determining the polynomial that "best" fits, in a least square sense, the error function curve in the neighborhood of its main minimum. This method involves two loops. The first one determines the approximate minimum. For this, five error points are computed, corresponding to −4,000 Hz, −2,000 Hz, 0 Hz, 2,000 Hz and 4,000 Hz, and the approximate estimate is taken to be the offset giving minimum error. In the second loop, four refined error values around the approximate estimate are determined as the approximate estimate ±1500 Hz and the approximate estimate ±750 Hz. These four values together with the approximate estimate are used to fit a fourth order polynomial. The derivative and the three roots to the polynomial are then determined. The estimate of the frequency offset parameter is the non-complex root that is the closest to the approximate estimate.

Thus the initial frequency offset and initial weight vector are determined. Thus, in a single SYNCH burst, all three parameters are estimated: the initial alignment, frequency offset and weight vector $w_r$. As previously mentioned, if there is not sufficient computational power, in alternate embodiments, these parameters may be determined in two or three SYNCH bursts.

This ends SYNCH mode. The remote terminal and base station now agree to, and enter normal mode. The quantities determined in SYNCH mode are used as initial conditions for normal mode, during which the method and apparatus of this invention continues to compensate for frequency offset and alignment. The values for offset and alignment are updated during normal mode.

C. Normal Mode Processing

Following is a description of the preferred embodiment of the method and apparatus of the present invention to estimate complex valued weight vector $w_r$ for a particular signal of interest, and to demodulate the signal on an ongoing basis. This is the goal of normal mode, and the method involves a recursive loop repeated every frame. The first time one enters normal mode, one starts the recursive loop with an initial estimate of $w_r$ and of the alignment and frequency offset obtained from SYNCH mode. On an ongoing basis, one starts the loop with starting estimate of $w_r$ and of the alignment and frequency offset obtained from the processing of the same signal on the previous frame.

Figure 6:
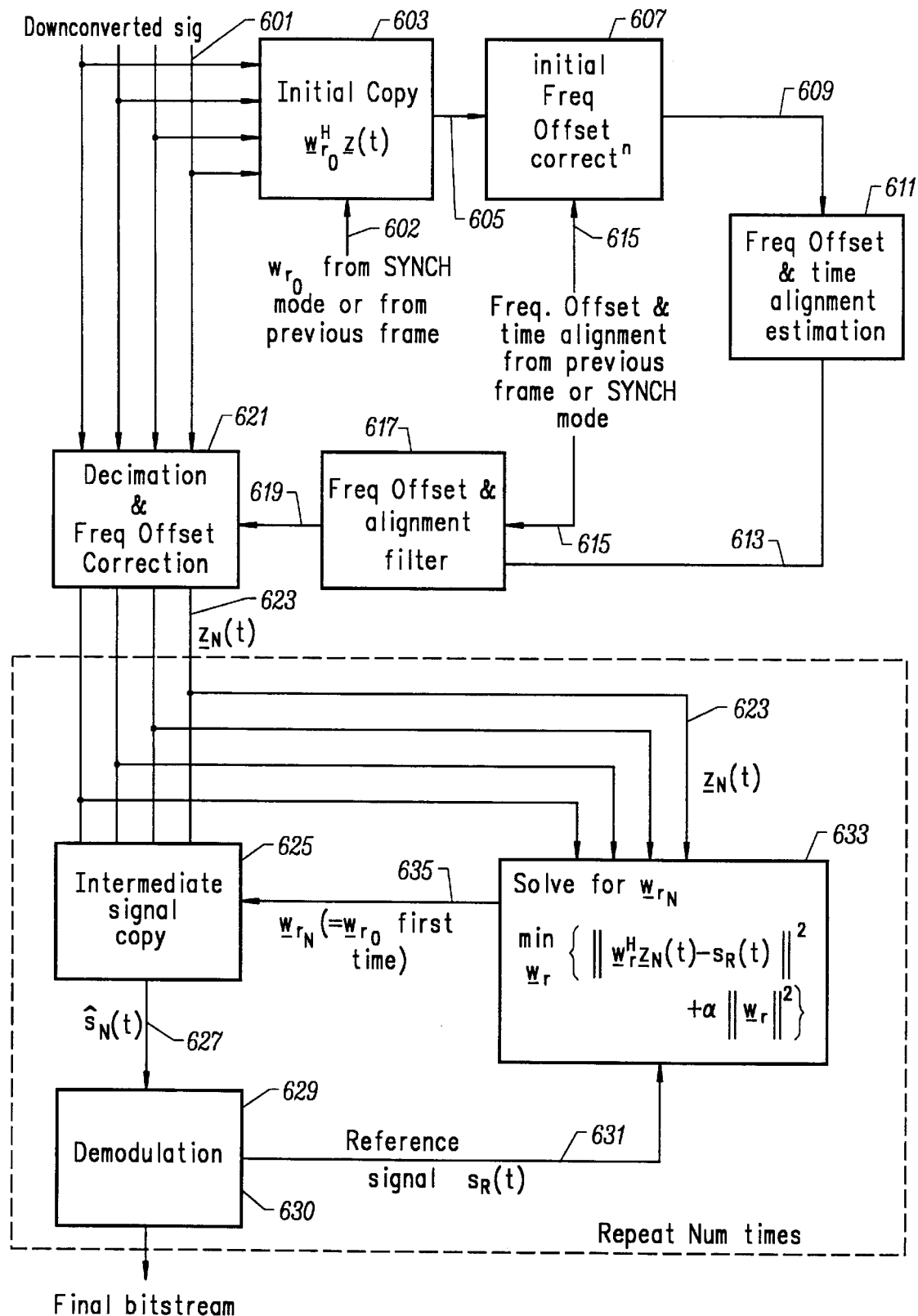
FIG. 6 is a flow chart of the demodulation method.

Normal mode is now described with aid of the flow chart of FIG. 6. Details are provided herein only for a particular signal of interest, and the other signals received are co-channel interferers. The details are clearly applicable to receiving any of the co-channel signals, and how to describe the method, for example using matrix notation, for simultaneously receiving all co-channel signals would be clear to one of ordinary skill in the art.

One starts with the value of $w_r$ (602 in FIG. 6) either from the previous frame or, at the start, from the SYNCH mode estimate. Given a starting value of $w_r$, denoted by $w_{r_0}$, one produces an estimate of the signal of interest by an initial signal copy operation 603 using this $w_{r_0}$ together with the downconverted received signal vector $z(t)$ (labeled 601) to produce an estimate 605 of the signal expressed as initial copy signal $$\hat{s}_0(t) = w_{r_0}^H z(t).$$

Step 607 corrects initial copy signal 605 for frequency offset using the frequency offset from the last frame, or from the SYNCH mode if this is the first frame. The frequency corrected initial copy signal 609 is now used in step 611 to compute a new frequency offset difference estimate and an alignment estimate. The result frequency offset difference and alignment estimates 613 are combined in an estimate filter 617 with estimates 615 from previous frames, or with the SYNCH mode estimate if this is the first frame, to produce the updated frequency offset and alignment estimates 619. Alternate embodiments may use filters that use frequency offset and alignment estimates from more than one previous frame.

The preferred embodiment of the present invention uses the following filter operation 617:

Offset_to_use=Offset_last_frame+ρ Offset$_{13}$ new _difference

Alignment_to_use=ρ Alignment_last_frame+(1−ρ) Alignment_new with constant ρ determined empirically by observing the typical frequency offset and alignment drift of remote terminals. In the particular implementation used, ρ=0.8. The purpose of filter operation 617 is to constrain the change in frequency offset and alignment from correction from frame to frame so that the presence of a strong interfering signal does not upset the estimates of these quantities.

Step 621 uses the frequency offset and alignment estimates to correct the input signal data z(t) to produce a corrected and decimated version of z(t), denoted as $z_N(t)$, and labeled 623 on the flowchart of FIG. 6. The decimation is by a factor of eight to give one $z_N(t)$ sample per symbol, which is 120 samples per burst.

The decimation part of the decimation and frequency correction step 621 consists of preserving only those points that are closest in alignment to the exact symbol times. The frequency correction consists of multiplying in time with the appropriate phase to adjust the residual frequency within the accuracy of the estimate.

These $z_N(t)$ samples are now used in a recursive loop to demodulate and estimate the weight vector to use for the other bursts or as $w_{r_0}$ for the next frame.

In step 625, an intermediate copy signal 627 is produced from $z_N(t)$ with the best estimate 635 Of $w_r$ which initially is $w_{r_0}$. As updates 635 are obtained to $w_r$, such updates, denoted by $w_{r_N}$, are used in step 625 to produce the decimated and corrected copy signal 627, denoted by $\hat{s}_N(t)$. Thus step 625's operation is $$\hat{s}_N(t) = w_{r_N}^H z_N(t),$$

with initially $w_{r_N} = w_{r_0}$. This signal copy operation 625 can be carried out more efficiently than the initial copy operation 603 because now, after decimation, only an eighth of the original 960 signal samples are involved for each burst.

The corrected copy signal 627 is demodulated in step 629 to produce the demodulated bitstream 630 and a reference signal 631 denoted as $s_R(t)$. Step 629 uses the finite alphabet properties of the corrected copy signal and of the known modulation format to produce the reference signal $s_R(t)$ which is frequency matched to $Z_N(t)$. That is, the frequency offset of the reference signal 631 is close enough to the frequency offset of the z signals that one can use it to reliably solve for a new value of $w_r$ denoted $w_{r_N}$. By definition, $s_R(t)$, the reference signal 631 has the required finite alphabet property.

Because reference signal $s_R(t)$ (631 in FIG. 6) does not suffer from such problems as uncertain residual frequency offset and uncertain alignment, it can now be used together with $z_N(t)$ to determine $w_{r_N}$, a better estimate of $w_r$. This is carried out in step 633. Many methods are well known in the prior art for thus projecting onto the $w_r$ plane. The goal is to solve for $w_{r_N}$ such that $w_{r_N}^H z_N(t)$ is as close as possible to reference signal $s_R(t)$. The preferred embodiment uses least squares optimization method, and a constraint on the norm of $w_r$ is added. Thus, the optimization problem solved is to determine $w_{r_N}$ which minimizes the cost function $$J = \|s_R(t) - w_{r_N}^H z_N(t)\|^2 + \delta \|w_{r_N}\|^2$$

where δ is some constant. In the preferred embodiment, a value of approximately 0.2 is used.

The loop is now repeated, and this new value 635 of $w_{r_N}$ is used for step 625 to determine a new copy signal for then determining a new reference signal. This loop is repeated Num times, and in the preferred embodiment, Num=2. After Num iterations, the demodulated signal 630 is used as the received symbol stream for the particular signal of interest for that burst, and $w_{r_N}$, the weight vector 635 is used for computing a new copy signal in step 625 for the next burst, or if it is the end of frame or operating in burst mode as described below, $w_{r_N}$ is set equal to $w_{r_0}$ for the next frame and the time and frequency offsets are filtered with the previous estimates and supplied to steps 607 and the filter 617 for the next frame.

In the preferred embodiment of the invention, the alternating projection loop repeats only the weight estimation and demodulation loop 625/629/633 for a burst being processed. The frequency offset and alignment is estimated only once for this burst. In another embodiment of the present invention, the flowchart of FIG. 6 is modified in that the $w_{r_N}$, (item 635) the new weight vector produced in step 633 is routed to step 603 to produce an improved copy signal which is then used to produce improved frequency offset and alignment estimates, and the process continues as in the previously described embodiment.

The weight estimate produced during the received bursts can be used for transmitting using the array of antennas. In one embodiment, the receive weight vector $w_r$ is used as the transmit weight vector for normal mode communication on that particular logical service channel. In an alternate embodiment, the complex conjugate of the receive weight vector $w_r$ is used as the transmit weight vector.

At the end of a frame (or at the end of a burst in burst mode), the method returns to step 603, and the ending frame's $w_{r_N}$ becomes $w_{r_0}$ for the new frame, and the complete loop is repeated. The previous frame's frequency offset and alignment estimates are used, with filtering such as step 617, for the initial frequency offset correction step 607 and for the estimate filter 617.

Frequency Offset Estimation And Alignment

Step 611 is the step of estimating the alignment and frequency offset. The method and apparatus of the present invention uses an alignment and frequency offset estimation technique 611 that exploits the finite alphabet properties of the signal and that works well in high interference situations, (low carrier to interference ratio), in particular high co-channel interference.

Consider the complex valued signal train 609 generated by the initial copy operation 603 followed by initial frequency offset correction 607, and denote signal 609 $\hat{s}_C(t)$. Let complex valued sequence $\{b_C(n)\}$ be the complex values of $\hat{s}_C(t)$ at the equally spaced sample points. The signal 609 is oversampled by a factor L (L=8 in the preferred embodiment). Note the difference in sampling period between this sequence and the complex valued signal train 627 denoted as $\hat{s}_N(t)$, and sequence $\{b_N(n)\}$. The $b_N(n)$ are the symbol points and occur every L samples of the oversampled signal $\hat{s}_C(t)$, while the $b_C(n)$ are the complex values of $\hat{s}_C(t)$ at the equally spaced sample points. Consider the phase difference signal between subsequent samples. Denote the differential stream formed by dividing $b_C(n)$ by the sample at the presumed previous constellation point $b_C(n-L)$ as $d_C(n)$. $\{d_C(n)\}$ is a signal sequence whose phase is the phase shift from one signal sample to the signal one baud symbol (L samples) away. That is, $$d_C(n) = b_C(n)/b_C(n-L) \Rightarrow \angle d_C(n) = \angle b_C(n) - b_C(n-L).$$

In prior-art π/4 DQPSK demodulation, the quadrant of complex valued $d_C(n)$ at the ideal differential constellation points is the demodulation decision. Denote the four quadrants of the complex plane as $\Phi_1$, $\Phi_2$, $\Phi_3$, and $\Phi_4$ for the first, second, third, and fourth quadrants, respectively. That the quadrant is sufficient for demodulation is the main consequence of the finite alphabet property of the π/4 DQPSK signals, and in the ideal case, at an ideal differential constellation point, $\angle d_C(n) = \pm \pi/4$ or $\pm 3\pi/4$. This finite alphabet property of the signal is now exploited. An ideal differential signal $d_{Cideal}(n)$ which is $d_C(n)$ relaxed to the nearest ideal differential constellation point is determined. That is, $$d_C(n) \in \Phi_i \Rightarrow \angle d_{Cideal}(n) = (2i-1)\pi/4, \quad i = 1, 2, 3, \text{ or } 4.$$

Denote by "fa" (for finite alphabet) the relationship between $d_C(n)$ and $d_{Cideal}(n)$. That is, $d_{Cideal}(n) = \text{fa}\{d_C(n)\}$. Note that in the demodulation step 629, subsequent points typically are already close to the symbol point, and therefore the differential signal samples are relatively close to an ideal π/4 DQPSK constellation point. This is not necessarily the case in the "fa" operation. Define alignment squared error $e_A^2(n) = |d_C(n) - d_{Cideal}(n)|^2$ as the square of the distance (in the complex plane) between a differential point and its closest ideal differential constellation point. Since no decimation of the data has yet been carried out, at a sample point that is not near a symbol point, the error distance may be relatively large.

In the embodiment of the invention, one does not explicitly determine the $\{d_C(n)\}$, but rather uses the fact that angle of each $d_C(n)$, $\angle d_C(n) = \angle[b_C(n)b_c^*(n-L)]$.

Let $[b_C(n)b_c^*(n-L)] = x_{Re}(n) + jx_{Im}(n)$ on the complex plane ($j^2 = -1$). Then the signal $|x_{Re}(n)| + j|x_{Im}(n)| \in \Phi_1$, the first quadrant, in which case $d_{Cideal}(n)$, when normalized, would be $1/\sqrt{2} + j1/\sqrt{2}$. The measure of alignment squared error $e_A^2(n)$ used in the preferred embodiment is $$e_A^2(n) = (|x_{Re}(n)| - 1/\sqrt{2})^2 + (|x_{Im}(n)| - 1/\sqrt{2})^2.$$

This avoids having to demodulate the signal. One now forms a cost function corresponding to and related to the time alignment parameter. In this embodiment, this cost function is $$J_x = \sum_{j=1}^{N/L} e_A^2(x + jL), \quad x = 0, \ldots, (L-1),$$

which is a summation of all the error distances for all the samples in a burst as a function of alignment x. The method chooses the point that has the minimum $J_x$ as the alignment point $x_{min}$. Other cost functions, such as mean absolute error, may alternatively be used.

Note that in this embodiment, $x_{min}$ is the alignment within the L sample points around a baud point, whereas in first embodiment using a SYNCH burst, the overall alignment is determined. The overall alignment is readily determined from $x_{min}$ by looking at framing bits using standard techniques well known in the art.

Thus once $x_{min}$ has been determined, one proceeds to estimate the frequency offset parameter using the alignment parameter estimate $x_{min}$ to align the data. Denote by $d'_{C(n)}$ and $d'_{Cideal}(n)$ respectively, the differential points $d_C(n)$ and $d_{Cideal}(n)$, respectively, after alignment by $x_{min}$. That is, $d'_C(n) = d_C(n + x_{min})$ and $d'_{Cideal}(n) = d_{Cideal}(n + x_{min})$. As before, and, as will be described below, the actual implementation does not involve explicitly determining $d'_C(n)$ and $d'_{Cideal}(n)$. Denote the phase error as $$e_p(n) = \angle d'_C(n) - \angle d'_{Cideal}(n)$$

Define a cost function as the average of the phase error $e_p(n)$ over the samples. The method of the present invention determines this without explicitly requiring demodulation.

Define $b'_C(n)$ as the aligned version of $b_C(n)$. The first step is to determine $[b'_C(n)b'_c^*(n-L)]$. Now determine $\Phi_i$, the quadrant $[b'_C(n)b'_c^*(n-L)]$ lies in. Next, depending on which quadrant $[b'_C(n)b'_c^*(n-L)]$ lies in, rotate $[b'_c^*(n)b'_c^*(n-L)]$ by $-\pi/4$, $-3\pi/4$, $3\pi/4$ or $\pi/4$, for $\Phi_i = 1, 2, 3$ or $4$, respectively. This moves $\angle [b'_C(n)b'_c^*(n-L)]$ to be in the range of between $-\pi/4$ and $\pi/4$. Denote this rotated $[b'_C(n)b'_c^*(n-L)]$ by $P'(n) = P_{Re}'(n) + jP_{Im}'(n)$ in the complex plane.

The method for computing $e_p(n)$ uses the fact that multiplying phasors adds the phase angles. To determine total phase one needs to separate out the positive phase contributions and the negative phase contributions. For each of these, one multiplies the phasors, taking note via a counter how many multiples of $2\pi$ there are since otherwise the result would be modulo $2\pi$. The final total phase is then the total positive phase contributions minus the total negative phase contributions. The pseudocode for this is as follows:

```
a_pos = 1;
a_neg = 1;
c_pos = 0;
c_neg = 0;
for n = 1, . . . , N/L
    ifP_Im'(n>0
        a"_pos = a_pos;
        a_pos *= P'(n);
        if((Re{a"_pos} Re{a"_pos})(Re{_pos}
        Im{a_pos})<0)
            c_pos += 1;
    else
        a"_neg = a_neg;
        a_neg *= P'(n)
        if((Re{a"_neg} Re{a"_neg})(Re{a_neg}
        Im{a_neg})<0)
            c_neg += 1;
    a_tot = (a_pos exp{-j(c_pos mod 4)π/2})
            (a_neg exp{j(c_neg\mod 4)π/2});
    tot = 2(Im a_tot >0)-1;
    Ave{ep(n)}=(∠(a_tot exp{-j totπ/4})
            +(c_pos — c_neg + tot/2)π/2)/(N/L);
```

Using knowledge of the sampling rate, this average phase angle error can be converted to the required estimate of the frequency offset. Note that this is done to minimize number of phase ($\angle$) calculations, because the arctan operation is expensive on a DSP as used in the preferred embodiment.

When this estimate is used to correct signals for frequency offset during demodulation, the average phase angle itself is used rather than the frequency offset estimate.

Demodulation Step

Step 629 is the demodulation step. Techniques for demodulating π/4 DQPSK signals are well-known in the art. One such prior-art technique is to produce the ratio signal between subsequent samples, and to identify the quadrant of the phase difference between subsequent symbols. The quadrant of these phase differences determines the transmitted symbol. Such a prior-art technique has two main deficiencies. The first is that the taking of ratios between subsequent symbols is in the presence of noise and distortion in both these symbols used to take the ratio, and the ratios thus have more distortion and noise than the original signal. The second deficiency is the making of a "hard" (i.e., irrevocable) decision about the symbol transmitted. Producing a π/4 DQPSK reference signal based on that hard decision leads to a reference signal that does not include residual frequency offset, which can be visualized as a (typically slow) rotation of the signal constellation, and such a reference signal may not be useable for re-projection into $w_r$ space in step 633.

The demodulation method of this invention solves these two problems simultaneously. It generates a reference signal 631 that both has the required known finite alphabet properties, and that tracks the (typically slow) rotation of the constellation due to residual frequency offset. Demodulation decisions are then made by examining the phase difference between subsequent samples of the actual signal and the reference signal which reduces the noise amplification which occurs with prior art techniques.

The method can be conceptualized as generating a reference signal that is advanced first by the ideal phase shift of the decided upon π/4 DQPSK signal. Then this ideal signal, that has been advanced ideally, is relaxed (that is, filtered) slowly towards the actual signal, so as to keep it from accumulating significant phase (i.e., frequency) offsets.

Consider the complex valued signal train 627 denoted as $\hat{s}_N(t)$, and let complex valued sequence $\{b_N(n)\}$ be the complex values of $\hat{s}_N(t)$ at the equally spaced symbol points. The method, like many conventional demodulation methods, starts by forming the differential stream, $d(n)$ which is obtained by dividing $b_N(n)$ by previous sample $b_N(n-1)$. This produces a signal sequence whose phase is the phase shift from one signal sample to the next. That is, $$d(n) = b_N(n)/b_N(n-1) \Rightarrow \angle d(n) = \angle b_N(n) - \angle b_N(n-1),$$

where ∠ is the phase. In prior-art π/4 DQPSK demodulation, the quadrant of complex valued $d(n)$ is the decision. That is, denoting again the i'th quadrant of the complex plane by $\angle_i$, $$\angle d(n) \in \Phi_i \Rightarrow \angle d(n) = (2i-1)\pi/4$$

where i=1, 2, 3 or 4. That the quadrant is sufficient for demodulation is the main consequence of the finite alphabet property of the π/4 DQPSK signals, and in the ideal case, $\angle d(n) = \pm \pi/4$ or $\pm 3\pi/4$.

The goals of demodulation step 629 are both to demodulate and to produce a reference signal. Let the reference signal have symbols at t=nT denoted by $b_R(n)$. A conventional way to produce such a reference signal might be to start with a reference signal whose phase at the starting time is the same as the phase of $b_N(n)$, the symbols of signal 627. The starting time is set to zero for convenience. That is, $$\angle b_R(0) = \angle b_N(0).$$

Then, for each subsequent decision, $\angle b_R(n)$ is advanced by exactly $\pm \pi/4$ or $\pm 3\pi/4$ as required by the π/4 DQPSK scheme. Setting for convenience $|b_R(0)|=1$, then with the conventional techniques, if $\angle d(n) \in \Phi_i$, then $b_R(1) = b_R(0) \exp[j \pi/4]$. The problem with this is that the $d(n)$ are relatively insensitive to the slow phase rotation caused by any small frequency offsets in $\hat{s}_N(t)$. Constructing $b_R(n)$ (and hence $s_R(t)$, the reference signal 631) in this simple manner would cause the phase of $s_R(t)$ to rotate slowly compared to the phase of $\hat{s}_N(t)$, and after some number of symbols, $s_R(t)$ and $\hat{s}_N(t)$ will be completely out of phase. Thus, one might have a cumulative error problem known as phase windup. A reference signal which suffers from phase windup in general is not suitable for estimating the weight vector in an alternating projection loop.

The method and apparatus of this invention avoids the phase windup problem by modifying the above "conventional" demodulation method. The phase windup is slow, and hence, assuming one has done a good job demodulating so far, at any particular point in time (i.e., at a particular value of n), the phase difference between $b_R(n)$ and $b_N(n)$ is small.

Figure 7:
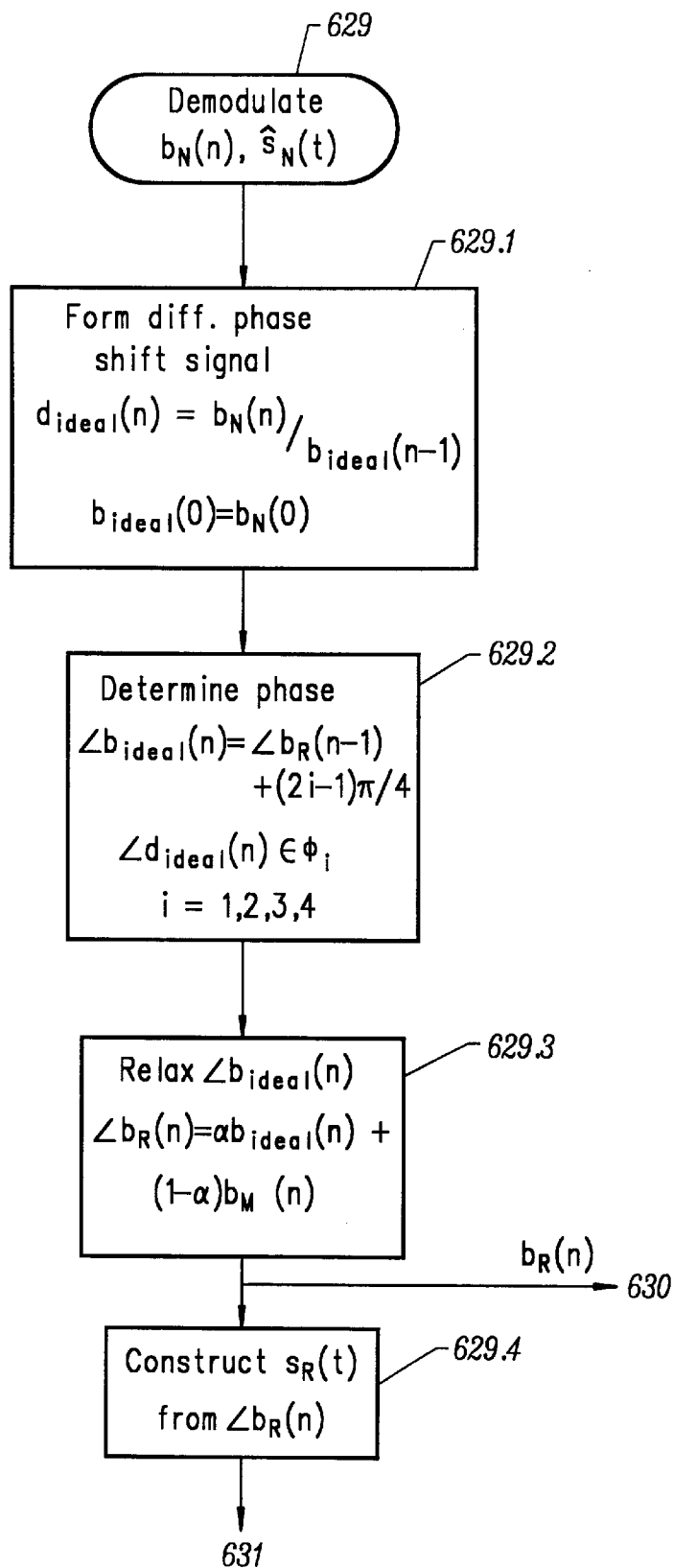
FIG. 7 is a detailed flow diagram of step 629 of FIG. 6.

FIG. 7 is a flow diagram that details demodulation step 629 of FIG. 6. To obtain the required reference signal symbol, a filter is now applied to move the phase of $b_R(n)$ a little towards the phase of $b_N(n)$. For this, an "idealized" reference signal having idealized reference signal symbols is determined (FIG. 7, step 629.1). Denote the idealized reference signal symbols by $b_{ideal}(n)$. Let $$b_{ideal}(0) = b_N(0).$$

and define $d_{ideal}(n)$ as $b_N(n)/b_R(n-1)$. Step 629.2 shows the computation of the phase of $b_{ideal}(n)$ by making a conventional demodulation decision based on $d_{ideal}(n)$. This decision is then used to determine $b_{ideal}(n)$ in two steps. First, the phase is determined as follows: if $\angle d_{ideal}(n) \in \Phi_i$, one sets $$\angle b_{ideal}(n) = \angle b_r(n-1) + (2i-1)\pi/4$$

Now, as shown in step 629.3 of FIG. 7, the phase of $b_{ideal}(n)$ is relaxed towards the phase of $b_N(n)$ as follows:

$$\angle b_R(n) = \angle b_{ideal}(n) - \gamma(\angle b_{ideal}(n) - \angle b_N(n)),$$

with γ a small parameter. With some manipulation, this can be written as $$\angle b_R(n) = \alpha \angle b_{ideal}(n) + (1-\alpha) \angle b_N(n),$$

where α=1−γ is a parameter which typically is close to 1. In the preferred embodiment, α=0.8 (approximately). The output of step 629.3 corresponds to output 630 of step 629 of FIG. 6. Step 629.4 indicates the construction of the reference signal, $s_R(t)$, from $\angle b_R(n)$ of step 629.3.

The above simple filter is used in the preferred embodiment to relax the "ideal" phase of the reference signal 631 slightly towards the phase of the copy signal 627. The parameter α states how much of the ideal phase to include. The general principle is that the ideal signal is corrected by a fraction of the difference between the real signal and the ideal signal. Other more complex filters may be used in alternate embodiments of the invention. The difference in phase between the real signal and the ideal signal is corrupted by zero mean noise, and the part due to frequency offset represents a DC offset to this noisy difference signal, and is the desired difference signal. The general principal in implementing the invention is to lowpass filter this difference signal to generate the DC offset. In the preferred embodiment described herein, a simple linear filter is used. How to build more sophisticated filters if required to get rid of the noise component would be clear to one of ordinary skill in the art.

In the implementation of the preferred embodiment, explicit decisions need not take place when generating the reference signal. Note again that $\angle d_{Ideal}(n) = \angle[b_N(n) b_R^*(n-$ 1)]. Normalize so that $b_R(0)=b_N(0)/|b_N(0)|$ and let $[b_N(n)b_R^*(n-1)]=x_{Re}(n)+jx_{Im}(n)$ for n>0. The implementation for generating the reference signal can be summarized by the following program:

```
for(n>0) {
    [b_N(n)b_R*(n-1)]= χ_Re(n) + jχ_Im(n);
    K = 2 (χ_Im(n) <0) + (χ_Re(n) <0);
    b_R(n) = b_R(n-1)expj{(2K-1)π/4};
    if (|b_N(n)|>0) b_R(n) = 0.8 b_R(n) + 0.2 b_N(n)/|b_N(n)|;
    b_R(n) = b_R(n)/|b_R(n)|;
}.
```

When demodulation is required, the actual decisions can be extracted from $x_{Re}(n)$ and $x_{Im}(n)$ as calculated above.

Weight Determination Step

To determine $w_{r_N}$ in step 633, the optimization problem solved is determining the $w_{r_N}$ which minimizes the cost function $$J=\|s_R(t)-w_{r_N}{}^H z_N(t)\|^2+\delta\|w_{r_N}\|^2$$

where $\delta$ is some constant. This problem can be formulated into a problem of minimizing a cost function $$(b-Ax)^H(b-Ax).$$

To translate to the present case, one makes the substitutions $b^T=S_R$, $A^T=Z_N$, and $x^T=w_{r_N}$. Note that the notation b (and A and x) used here for "generic" vectors have no relationship to the symbols $b_k(n)$, $b(n)$, $b_0(n)$, etc., used elsewhere herein. Note also that by making the substitution $D^T=[A^T]\mathrm{diag}(\zeta^2)$ and $g=[b|0]$, it can be showing that $$(g-Dx)^H(g-Dx)=(b-Ax)^H(b-Ax)+x\,\mathrm{diag}(\zeta^2)X^H.$$

Thus, the problem of determining the $w_{r_N}$ which minimizes the cost function J can be stated as a standard least squares minimization problem. In the preferred embodiment, the conjugate gradient method is used for this minimization, and the reader is referred to the description of conjugate gradient method herein for determining initial time alignment during SYNCH mode. In an alternate embodiment, $w_{r_N}$ is determined by determining the pseudo-inverse. The reader is again referred to the description herein for determining initial time alignment during SYNCH mode for details on direct pseudoinverse calculation.

Other Modulation Schemes and Adding Spatio-Temporal Processing

The preferred embodiment of this invention uses π/4 DQPSK modulation. The important property required for the invention is that the amplitudes and phases of the modulation scheme be part of a finite alphabet, and that phase difference between subsequent symbols be one of a finite alphabet. Modifying the details to cover such alternate modulation schemes would be clear to one of ordinary skill in the art.

Similarly, modifying the spatial processing of such operations as signal copy to include time equalization would require the elements of weight vectors to be impulse responses, so that simple multiplications in the signal copy and similar operations would become convolutions. Modifying the embodiments to include such spatio-temporal processing would be clear to one of ordinary skill in the art.

D. Apparatus for Demodulation

The architecture of the preferred embodiment of the apparatus of the present invention as shown in FIG. 1 is now described in more detail. The m outputs 103.1, 103.2, ..., 103.m (m=4 in the preferred embodiment) of the m antennas 101.1, 101.2, ..., 101.m are received and mixed down in analog in three stages from the carrier frequency (around 1.9 GHz) to a final intermediate frequency (IF) of 384 kHz. This is carried out in the m RX blocks 105.1, 105.2, ..., 105.m to generate signals 107.1, 107.2, ..., 107.m, which then are digitized (sampled) at 1.536 MHz by A/D converters 109.1, 109.2, ..., 109.m to produce real valued signal 111.1, 111.2, ..., 111.m. Final down-converting to baseband is carried out digitally by blocks 113.1, 113.2, ..., 113.m which are GrayChip Inc. GC2011A digital filter devices. The downconverters also carry out the time demultiplexing to produce four outputs. Taking for example, the first downconverter 113.1, its outputs are 115.1.0, 115.1.1, 115.1.2 and 115.1.4, one output for each of the receive time slots 0, 1, 2 and 3. Each of the timeslot signals also is scaled by each of the downconverters, the scaling as required for further processing. How to carry out such scaling for signal processing would be clear to one of ordinary skill in the art. Thus, for any timeslot, m signals are produced, and these are $z_1(t)$, $z_2(t)$, ..., $z_m(t)$, the complex valued responses of the first, second, ..., m'th antenna elements, respectively. For the 0'th time slot, these are shown as signals 115.1.0, 115.2.0, 115.3.0, and 115.4.0

Thus, for any timeslot, the apparatus comprises a receiver for each of the m antennas, each receiver including a digitizer, the outputs of the m receivers being the responses of the corresponding antenna elements. RX blocks 103, A/D blocks 109 and downconverter blocks 113 together are the m receivers in the particular embodiment, and any other receiving arrangement might be substituted.

For any timeslot, SYNCH mode processing to determine the initial weight matrix, frequency offset and time alignment parameters, and normal mode processing to provide frequency offset and alignment determination, frequency offset and alignment correction, signal copy operations, weight vector determination, decimation, filtering, and demodulation is carried out by a DSP, one for each timeslot. The four DSPs for the four receive time slots 0, 1, 2 and 3 are shown as blocks 117.0, 117.1, 117.2, and 117.3, respectively. Each is a Motorola, Inc., DSP56301. The resulting demodulated signals are shown as 119.0, ..., 119.3.

Thus the apparatus includes an apparatus for initial weight matrix, frequency offset and time alignment parameter determination, as well as means for frequency offset determination, alignment determination, frequency offset correction, alignment correction, signal copy operations, weight vector determination, decimation, filtering, and demodulation.

Although this invention has been described with respect to preferred embodiments, those embodiments are illustrative only. No limitation with respect to the preferred embodiments is intended or should be inferred. It will be observed that numerous variations and modifications may be affected without departing from the true spirit and scope of the novel concept of the invention, and it is intended that the scope of the invention be defined by the claims appended hereto.

What is claimed is:

1. In a wireless communication system including at least one base station and at least one remote terminal of a set of remote terminals, said base station comprising an array of antennas, a method for demodulating a modulated signal transmitted by a particular remote station to produce a reference remote terminal transmission signal, said method implemented at said at least one base station, said modulated signal modulated at symbol points by a modulation scheme that has a finite symbol alphabet, each distinct antenna of the array of antennas receiving a corresponding received signal, all the received signals forming a received signal vector, each received signal comprising signals from all the remote terminals of the set that are transmitting, the method comprising:

a) separating from the received signal vector a remote terminal signal corresponding to the particular remote terminal by using a spatial weight vector corresponding to the particular remote terminal, to form a particular terminal copy signal, said terminal copy signal comprising samples; and b) for each symbol point i) constructing an ideal signal from the particular terminal copy signal, the ideal signal having said modulation scheme, the amplitude and phase of the ideal signal determined from the amplitude and phase of said terminal copy signal, with the ideal signal set at the initial symbol point to be equal to said terminal copy signal at the initial symbol point; and ii) relaxing the ideal signal towards said terminal copy signal, producing a reference remote terminal transmission signal.

2. The method of claim 1 wherein the alphabet of said modulation scheme includes symbols that have different amplitudes and wherein said step of relaxing relaxes the amplitude of the ideal signal towards the amplitude of said terminal copy signal, producing the reference remote terminal transmission signal.

3. The method of claim 2 wherein said step of relaxing the amplitude $|b_{ideal}(n)|$ of the ideal signal $b_{ideal}(n)$ towards the amplitude $|b_N(n)|$ of said terminal copy signal $b_N(n)$ corresponds to computing the amplitude $|b_R(n)|$ of the reference remote terminal transmission signal $b_R(n)$ as $$|b_R(n)|=\alpha|b_{ideal}(n)|+(1-\alpha)|b_N(n)|$$

where $0<\alpha<1$.

4. The method of claim 1 wherein the alphabet of said modulation scheme includes symbols that have different phases and wherein said step of relaxing relaxes the phase of the ideal signal towards the phase of said terminal copy signal, producing the reference remote terminal transmission signal.

5. The method of claim 4, wherein the relaxing step (b)(ii) relaxes the phase $\angle b_{ideal}(n)$ of the ideal signal $b_{ideal}(n)$ towards the phase $\angle b_N(n)$ of said terminal copy signal $b_N(n)$ by an amount dependent on the difference between the ideal signal phase $\angle b_{ideal}(n)$ and the terminal copy signal phase $\angle b_N(n)$.

6. The method of claim 5 wherein said step of relaxing the phase $\angle b_{ideal}(n)$ of the ideal signal $b_{ideal}(n)$ towards the phase $\angle b_N(n)$ of said terminal copy signal $b_N(n)$ corresponds to computing the phase $\angle b_R(n)$ of the reference remote terminal transmission signal $b_R(n)$ as $$\angle b_R(n)=\alpha\angle b_{ideal}(n)+(1-\alpha)\angle b_N(n)$$

where $0<\alpha<1$.

7. The method of claim 4 wherein said modulation scheme is phase shift keying.

8. The method of claim 7, wherein the modulation scheme is differential phase shift keying, the ideal signal construction step (b)(i) constructs the ideal signal phase by advancing the phase of the reference remote terminal transmission signal at the previous symbol point of the reference remote terminal transmission signal by a modulation scheme dependent amount determined by the difference between the terminal copy signal phase and the phase of the reference remote terminal transmission signal at the previous symbol point of the reference remote terminal transmission signal, and the relaxing step (b)(ii) relaxes the phase $\angle b_{ideal}(n)$ of the ideal signal $b_{ideal}(n)$ towards the phase $\angle b_N(n)$ of said terminal copy signal $b_N(n)$ by an amount dependent on the difference between the ideal signal phase $\angle b_{ideal}(n)$ and the terminal copy signal phase $\angle b_N(n)$.

9. The method of claim 8 wherein said step of relaxing the phase $\angle b_{ideal}(n)$ of the ideal signal $b_{ideal}(n)$ towards the phase $\angle b_N(n)$ of said terminal copy signal $b_N(n)$ corresponds to computing the phase $\angle b_R(n)$ of the reference remote terminal transmission signal $b_R(n)$ as $$\angle b_R(n)=\alpha\angle b_{ideal}(n)+(1-\alpha)\angle b_N(n)$$

where $0<\alpha<1$.

10. The method of claim 4 wherein said modulation scheme is QAM and each symbol in said alphabet has a distinct phase.

11. In a wireless communication system including at least one base station and at least one remote terminal of a set of remote terminals, said base station comprising an array of antennas, a method for demodulating a modulated signal transmitted by a particular remote station to produce a demodulated remote terminal transmission signal, said method implemented at said at least one base station, said modulated signal modulated by a modulation scheme that has a finite symbol alphabet, each distinct antenna of the array of antennas receiving a corresponding received signal, all the received signals forming a received signal vector, each received signal comprising signals from all the remote terminals of the set that are transmitting, the method comprising:

a) down-converting the received signal vector;

b) estimating the time alignment and frequency offset of the received signal vector;

c) separating from the received signal vector a remote terminal signal corresponding to the particular remote terminal by using an initial spatial weight vector corresponding to the particular remote terminal, said separating including correcting for time alignment and frequency offset using the estimated time alignment and frequency offset, said separating forming a corrected terminal copy signal;

d) demodulating the corrected terminal copy signal to produce a demodulated signal; and e) performing at least once e1) synthesizing a reference signal from the demodulated signal;

e2) computing a new spatial weight vector by minimizing a prescribed cost function, said cost function dependent on said reference signal; and e3) performing steps (c) and (d) using in step (c) the last determined new spatial weight vector instead of the initial spatial weight vector.

12. The method of claim 11 wherein step (e.3) further comprises performing step (b).

13. The method of claim 11 wherein step (c) further comprises c.1) applying the estimated time alignment and frequency offset as corrections to the received signal vector to form a corrected signal vector; and c.2) separating from the corrected signal vector the corrected terminal copy signal by using the initial spatial weight vector corresponding to the particular remote terminal.

14. The method of claim 11 wherein step (c) further comprises c1) separating from the received signal vector a particular terminal copy signal corresponding to the particular remote terminal by using the initial spatial weight vector corresponding to the particular remote terminal; and c2) applying the estimated frequency offset as corrections said particular terminal copy signal to form a frequency corrected terminal copy signal.

15. In a demodulation method implemented on a base station of a wireless system which includes one or more base stations and one or more remote terminals of a set of remote terminals, said base station comprising and array of antennas, the method demodulating a modulated signal transmitted by a particular remote terminal to produce a demodulated remote terminal transmission signal, said modulated signal modulated by a modulation scheme that has a finite symbol alphabet, each distinct antenna of the array receiving a corresponding received signal, all the received signals forming a received signal vector, each received signal receiving signals from all the remote terminals of the set transmitting, the method including an alternating projection loop which includes the steps of:

a) down-converting the received signal vector;

b) separating from a signal vector derived from the received signal vector a remote terminal signal corresponding to the particular remote terminal to form a particular terminal copy signal;

c) determining an ideal reference signal from the particular terminal copy signal;

d) determining a spatial weight vector from the ideal reference signal; and e) performing steps (b), (c) and (d) at least once, step (b) using the latest spatial weight vector determined in step (d), the improvement comprising using in step (d) a relaxed reference signal which has been relaxed from the ideal reference signal towards the particular terminal copy signal.

16. In a demodulation method implemented on a base station of a wireless system which includes one or more base stations and one or more remote terminals of a set of remote terminals, said base station comprising an array of antennas, the method demodulating a modulated signal transmitted by a particular remote terminal to produce a demodulated remote terminal transmission signal, said modulated signal modulated by a modulation scheme that has a finite symbol alphabet, some of said symbols having different phases, each distinct antenna of the array receiving a corresponding received signal, all the received signals forming a received signal vector, each received signal receiving signals from all the remote terminals of the set transmitting, the method including an alternating projection loop which includes the steps of:

a) down converting the received signal vector;

b) separating from a signal vector derived from the received signal vector a remote terminal signal corresponding to the particular remote terminal to form a particular terminal copy signal;

c) determining an ideal reference signal from the particular terminal copy signal;

d) determining a spatial weight vector from the ideal reference signal; and e) performing steps (b), (c) and (d) at least once, step (b) using the latest spatial weight vector determined in step (d), the improvement comprising estimating the time alignment and frequency offset of the received signals, and using in step (d) a corrected reference signal which has been corrected for frequency offset and time alignment.

17. The improvement of claim 16 wherein the phase of the corrected reference signal used in step (d) has been relaxed from the phase of the ideal reference signal towards the phase of the particular terminal copy signal.

18. An apparatus for producing a reference signal in a base station for a wireless communication system, said system including at least one base station and at least one remote terminal of a set of remote terminals, the signal transmitted by a particular remote station modulated at symbol points by a modulation scheme that has a finite symbol alphabet, the base station including an array of antennas, each antenna receiving a corresponding received signal, all the received signals forming a received signal vector; each received signal comprising signals from all the remote terminals of the set that are transmitting, said apparatus comprising:

a) means for separating from the received signal vector a remote terminal signal corresponding to a particular remote terminal which is transmitting, said separating means using a spatial weight vector corresponding to the particular remote terminal, to form a particular terminal copy signal, said terminal copy signal comprising samples; and b) a demodulator for produce a reference remote terminal transmission signal, said demodulator comprising:

i) means for constructing an ideal signal from the particular terminal copy signal, the ideal signal having said modulation scheme, the amplitude and phase of the ideal signal determined from the amplitude and phase of said terminal copy signal, with the ideal signal set at the initial symbol point to be equal to said terminal copy signal at the initial symbol point; and ii) means for relaxing the ideal reference signal towards said terminal copy signal, producing the reference remote terminal transmission signal.

19. The apparatus of claim 18 wherein the alphabet of said modulation scheme includes symbols that have different amplitudes and wherein said relaxing means relaxes the amplitude of the ideal signal towards the amplitude of said terminal copy signal, producing the reference remote terminal transmission signal.

20. The apparatus of claim 19 wherein said means for relaxing the amplitude $|b_{ideal}(n)|$ of the ideal signal $b_{ideal}(n)$ towards the amplitude $|b_N(n)|$ of said terminal copy signal $b_N(n)$ includes means for computing the amplitude $|b_R(n)|$ of the reference remote terminal transmission signal $b_R(n)$ as $$|b_R(n)| = \alpha |b_{ideal}(n)| + (1-\alpha)|b_N(n)|$$

where $< \alpha < 1$.

21. The apparatus of claim 18 wherein the alphabet of said modulation scheme includes symbols that have different phases and wherein said relaxing means relaxes the phase of the ideal signal towards the phase of said terminal copy signal, producing the reference remote terminal transmission signal.

22. The apparatus of claim 21, wherein the means for relaxing relaxes the phase $\angle b_{ideal}(n)$ of the ideal signal $b_{ideal}(n)$ towards the phase $\angle b_N(n)$ of the terminal copy signal $b_N(n)$ by an amount dependent on the difference between the ideal signal phase $\angle b_{ideal}(n)$ and the terminal copy signal phase $\angle b_N(n)$.

23. The apparatus of claim 22 wherein said means for relaxing the phase $\angle b_{ideal}(n)$ of the ideal signal $b_{ideal}(n)$ towards the phase $\angle b_N(n)$ of said terminal copy signal $b_N(n)$ includes means for computing the phase $\angle b_R(n)$ of the reference remote terminal transmission signal $b_R(n)$ as $$\angle b_R(n) = \alpha \angle b_{ideal}(n) + (1-\alpha) \angle b_N(n)$$

where $0 < \alpha < 1$.

24. The apparatus of claim 21 wherein said modulation scheme is phase shift keying.

25. The apparatus of claim 24, wherein the modulation scheme is differential phase shift keying, the means for ideal signal constructing constructs the ideal signal phase by advancing the phase of the reference remote terminal transmission signal at the previous symbol point of the reference remote terminal transmission signal by a modulation scheme dependent amount determined by the difference between the terminal copy signal phase and the phase of the reference remote terminal transmission signal at the previous symbol point of the reference remote terminal transmission signal, and the means for relaxing relaxes the phase $\angle b_{ideal}(n)$ of the ideal signal $b_{ideal}(n)$ towards the phase $\angle b_N(n)$ of the terminal copy signal $b_N(n)$ by an amount dependent on the difference between the ideal signal phase $\angle b_{ideal}(n)$ and the terminal copy signal phase $\angle b_N(n)$.

26. The apparatus of claim 25 wherein said step of relaxing the phase $\angle b_{ideal}(n)$ of the ideal signal $b_{ideal}(n)$ towards the phase $\angle b_N(n)$ of said terminal copy signal $b_N(n)$ corresponds to computing the phase $\angle b_R(n)$ of the reference remote terminal transmission signal $b_R(n)$ as $$\angle b_R(n) = \alpha \angle b_{ideal}(n) + (1-\alpha) \angle b_N(n)$$

where $0 < \alpha < 1$.

27. The apparatus of claim 21 wherein said modulation scheme is QAM and each symbol in said alphabet has a distinct phase.

28. An apparatus for demodulating a modulated signal transmitted by a particular remote station to produce a demodulated remote terminal transmission signal in a wireless communication system, said system including at least one base station and at least one remote terminal of a set of remote terminals, said base station comprising an array of antennas, said apparatus in said at least one base station, said modulated signal modulated by a modulation scheme that has a finite symbol alphabet, each distinct antenna of the array of antennas receiving a corresponding received signal, all the received signals forming a received signal vector, each received signal comprising signals from all the remote terminals of the set that are transmitting, the apparatus comprising:

a) a down-converter for downconverting the received signal vector;

b) means for estimating the time alignment and frequency offset of the received signal vector;

c) means for separating from the received signal vector a remote terminal signal corresponding to the particular remote terminal, said separating means using an initial spatial weight vector corresponding to the particular remote terminal, said separating means comprising means for correcting for time alignment and frequency offset using the estimated time alignment and frequency offset, said separating means forming a corrected terminal copy signal;

d) a demodulator for demodulating the corrected terminal copy signal to produce a demodulated signal;

e) means synthesizing a reference signal from the demodulated signal; and f) means for computing a new spatial weight vector by minimizing a prescribed cost function, said cost function dependent on said reference signal.

* * * * *